United States Patent
Gao et al.

(10) Patent No.: US 12,483,453 B2
(45) Date of Patent: Nov. 25, 2025

(54) ADVERTISING METHOD AND COMMUNICATION DEVICE

(71) Applicant: Huawei Technologies Co., Ltd., Shenzhen (CN)

(72) Inventors: Lei Gao, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 135 days.

(21) Appl. No.: 18/419,756

(22) Filed: Jan. 23, 2024

(65) Prior Publication Data
US 2024/0163145 A1 May 16, 2024

Related U.S. Application Data

(63) Continuation of application No. PCT/CN2022/105624, filed on Jul. 14, 2022.

(30) Foreign Application Priority Data

Jul. 23, 2021 (CN) .......................... 202110839838.X

(51) Int. Cl.
*H04L 27/18* (2006.01)
*H04B 1/715* (2011.01)
*H04L 1/00* (2006.01)

(52) U.S. Cl.
CPC ............. *H04L 27/18* (2013.01); *H04B 1/715* (2013.01); *H04L 1/0041* (2013.01); *H04B 2001/7154* (2013.01)

(58) Field of Classification Search
CPC ....... H04L 27/18; H04L 1/0041; H04B 1/713; H04B 1/715
USPC ........................................................ 375/295
See application file for complete search history.

(56) References Cited

U.S. PATENT DOCUMENTS

| 2009/0063214 | A1* | 3/2009 | Liu ..................... G06Q 30/0273 705/14.69 |
| 2015/0045016 | A1 | 2/2015 | Xiong et al. |
| 2017/0223604 | A1 | 8/2017 | Skillermark et al. |
| 2019/0326934 | A1 | 10/2019 | Kim et al. |
| 2024/0113926 | A1* | 4/2024 | Gao ....................... H03M 13/13 |

FOREIGN PATENT DOCUMENTS

CN 111935843 A 11/2020

* cited by examiner

Primary Examiner — Leila Malek
(74) Attorney, Agent, or Firm — Conley Rose, P.C.

(57) ABSTRACT

In an advertising method, a first device generates a first signal, where a modulation type of the first signal is PSK modulation. The first signal sequentially includes a sequence part, a first part, and a second part. The sequence part includes at least one of a predefined sequence, a predefined signal, a preconfigured sequence, and a preconfigured signal. The first part includes first control information encoded by using a polar code. The second part includes first advertisement information. The first device sends the first signal on a first advertisement dedicated frequency hopping channel.

20 Claims, 10 Drawing Sheets

ADVERTISING METHOD AND COMMUNICATION DEVICE

CROSS-REFERENCE TO RELATED APPLICATIONS

This application is a continuation of International Patent Application No. PCT/CN2022/105624 filed on Jul. 14, 2022, which claims priority to Chinese Patent Application No. 202110839838.X filed on Jul. 23, 2021. The disclosures of the aforementioned applications are hereby incorporated by reference in their entireties.

TECHNICAL FIELD

The present disclosure relates to the communication field, and in particular, to an advertising method and a communication device.

BACKGROUND

With continuous development of global communication technologies, wireless communication technologies have surpassed wired communication technologies in a development speed and application, and present a booming development trend. Smart devices such as smart transportation devices, smart home devices, and robots are gradually entering daily life of people. In a wireless communication scenario in which the smart devices are located, a plurality of communication domains may be included in a specific communication area or range. The communication domain refers to a system including a group of communication nodes having a communication relationship and a communication connection relationship (that is, a communication link) between the communication nodes. One communication domain includes one primary communication node (which may be referred to as a primary node for short) and at least one secondary communication node (which may be referred to as a secondary node for short). The primary node manages a time-frequency resource of the communication domain, and has a function of scheduling a resource for a communication link between communication nodes in the communication domain. An intelligent cockpit wireless communication system is used as an example. For example, a topological relationship of an intra-vehicle communication link is shown in FIG. 1: There are a plurality of communication domains (a communication domain 1, a communication domain 2, and a communication domain 3) in a vehicle, where the communication domain 1 includes a mobile phone, a headset, and a wearable device; the communication domain 2 includes a cockpit domain controller (CDC), a screen, a microphone, a sound box, the mobile phone, the headset, and the wearable device; and the communication domain 3 includes a passive entry passive start (PEPS) system, a body control module (BCM), a mobile phone key, and a vehicle key. It may be understood that each communication domain includes one primary node (also referred to as a G node) and at least one secondary node (also referred to as a T node), where the primary node schedules the secondary node, to implement mutual data transmission between nodes. For example, in the communication domain 1, the mobile phone is a primary node, and the headset and the wearable device are respectively secondary nodes.

Advertisement information is used between devices to implement functions of mutual discovery, connection, and public data transmission between the devices. The devices are in an advertising state and repeatedly send the advertisement information.

To ensure normal operation of an advertising service, currently, there is an urgent need to improve coverage performance and an anti-interference capability of an advertisement signal.

SUMMARY

Embodiments of the present disclosure provide an advertising method and a communication device to improve coverage performance and an anti-interference capability of advertisement information.

According to a first aspect, an embodiment of the present disclosure provides an advertising method, mainly applied to a system including a group of communication nodes having a communication relationship and a communication connection relationship (that is, a communication link) between the communication nodes. Any communication node in the system may initiate an advertisement. In this embodiment, a first device is included in the system, and the first device initiates an advertisement. The advertising method specifically includes: The first device generates a first signal, where a modulation type of the first signal is phase-shift keying (PSK) modulation, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information. Then, the first device sends the first signal on a first advertisement dedicated frequency hopping channel.

The PSK modulation may be binary phase-shift keying (BPSK) modulation, quadrature phase-shift keying (QPSK) modulation, 8 phase-shift keying (8PSK) modulation, or one type of PSK modulation specified in a protocol.

In this embodiment, the first device sends the first signal generated through PSK modulation, and the control information in the first signal is generated through polar code encoding. Then, the first device sends the first signal. The PSK modulation scheme may improve receiver sensitivity of the control information at a signal receive end and improve anti-noise and anti-interference performance. Even if a receiving device receives the first signal at a relatively low signal-to-noise ratio, the receiving device can still obtain the control information in the first signal. Therefore, the first signal has relatively strong coverage performance and anti-interference capability. In addition, the advertisement information is used by the first device to notify another device of information about the first device, and the another device determines, based on the first advertisement information, whether to perform discovery with the first device, whether to connect to the first device, or whether to continue to receive a signal associated with the first signal.

In a possible implementation, the first advertisement information may also be encoded by using a polar code. In this way, after the first device sends the first signal, even if the receiving device receives the first signal at a relatively low signal-to-noise ratio, the receiving device can still obtain the advertisement information in the first signal. Therefore, the first signal has relatively strong coverage performance and anti-interference capability.

In another possible implementation, the first advertisement information may further include at least one of the following information: first advertisement type information, an identifier of the first device, a type identifier of the first device, an identifier of a type group in which the first device is located, an identifier of a device group in which the first device is located, a business service requested by the first device, a business service provided by the first device, capability information of the first device, and service data information. The first advertisement type information includes at least one of the following information: whether the first device is scannable, whether the first device is connectable, the first signal indicating whether directional information is included in the first signal and/or a signal associated with the first signal, and the first signal indicating whether non-directional information is included in the first signal and/or the signal associated with the first signal. In this way, the first device may notify another device of information about the first device, and the another device determines, based on the first advertisement information, whether to perform discovery with the first device, whether to connect to the first device, or whether to continue to receive the signal associated with the first signal.

In this embodiment, the type identifier of the first device is used to indicate a specific type of the first device, for example, indicate that the first device is of a possible type such as a headset, a mobile phone, a watch, a tablet computer, or a notebook computer. The identifier of the type group in which the first device is located is used to indicate a name obtained after the device is classified based on a specific classification rule. For example, based on a user requirement, the headset and the watch are grouped into one group named a wearable device, and the mobile phone, the tablet computer, and the notebook computer are grouped into one group named a working device. In this embodiment, for an advertising node that sends an advertisement signal, the advertisement signal may indicate an extended advertisement signal sent by the advertising node. The extended advertisement signal may indicate a chain extended advertisement signal or a synchronous extended advertisement signal sent by the advertising node, and a chain extended advertisement signal or a synchronous extended advertisement signal sent by the advertising node may indicate another chain extended advertisement signal or synchronous extended advertisement signal sent by the advertising node. That is, for signals sent by the advertising node, a plurality of signals are associated through the foregoing one-level or multi-level indication. The signal associated with the first signal includes the extended advertisement signal associated through the foregoing one-level indication, and the chain extended advertisement signal or the synchronous extended advertisement signal associated through the foregoing multi-level indication. Whether an advertisement in the advertisement type information is scannable is whether a corresponding advertisement signal sent on an advertisement dedicated frequency hopping channel or an extended advertisement signal that is sent on a universal frequency hopping channel resource and that is indicated by the advertisement signal corresponds to a resource for receiving a scan request signal. Whether being connectable is whether a corresponding advertisement signal sent on an advertisement dedicated frequency hopping channel or an extended advertisement signal that is sent on a universal frequency hopping channel resource and that is indicated by the signal corresponds to a resource for receiving an access request signal. Whether the directional information is included is whether a signal to be received by a specific device, a specific type of device, or a device belonging to a specific device group is carried in an advertisement signal sent on an advertisement dedicated frequency hopping channel and/or a signal associated with the signal. Whether the non-directional information is included is whether information for which no receiving device is specified is carried in an advertisement signal sent on an advertisement dedicated frequency hopping channel and/or a signal associated with the advertisement signal.

In this embodiment, one signal "indicates" another signal, including indicating a transmission resource of the another signal, for example, a time domain resource or a frequency domain resource. For example, the advertisement signal may indicate an extended advertisement signal sent by the advertising node, and the advertisement signal may indicate resource information for sending the extended advertisement signal. In this embodiment, a frequency hopping system has a plurality of universal frequency hopping channels, and when sending an extended advertisement signal, the first device may select one universal frequency hopping channel from the plurality of universal frequency hopping channels for sending. If the receiving device subsequently sends feedback information to the first device, the feedback information is also sent on the same universal frequency hopping channel.

In another possible implementation, the first device may further generate a second signal. A modulation type of the second signal is PSK modulation. The second signal sequentially includes a sequence part, a first part, and a second part. The sequence part carries at least one of the following: a predefined sequence, a predefined signal, a preconfigured sequence, and a preconfigured signal. The first part includes second control information encoded by using a polar code. The second part includes first extended advertisement information. Then, the first device indicates, by using the first advertisement information, resource information used to send the second signal, and sends the second signal on a universal frequency hopping channel. The first device sends the second signal generated through PSK modulation, and the control information in the second signal is generated through polar code encoding. Then, the first device sends the second signal. Even if the receiving device receives the second signal at a relatively low signal-to-noise ratio, the receiving device can still obtain the control information in the second signal. Therefore, the second signal has relatively strong coverage performance and anti-interference capability. In addition, the first device sends the second signal on the universal frequency hopping channel, thereby avoiding congestion on the advertisement dedicated frequency hopping channel, reducing an interference level of the advertisement dedicated frequency hopping channel, and improving reliability of sending an advertisement signal.

In another possible implementation, the first extended advertisement information is encoded by using a polar code. In this way, after the first device sends the second signal, even if the receiving device receives the second signal at a relatively low signal-to-noise ratio, the receiving device can still obtain the advertisement information in the second signal. Therefore, the second signal has relatively strong coverage performance and anti-interference capability.

In another possible implementation, the first extended advertisement information further includes at least one of the following information: second advertisement type information, the identifier of the first device, the type identifier of the first device, the identifier of the type group in which the first device is located, the identifier of the device group in which the first device is located, the business service requested by the first device, the business service provided by the first device, the capability information of the first device, and the service data information. The second advertisement type information includes at least one of the following information: whether the first device is scannable, whether the first device is connectable, the second signal indicating whether directional information is included in the second signal and/or a signal associated with the second signal, and the second signal indicating whether non-directional information is included in the second signal and/or the signal associated with the second signal. In this way, the first device may notify another device of information about the first device, and the another device determines, based on the first extended advertisement information, whether to perform discovery with the first device, whether to connect to the first device, or whether to continue to receive the signal associated with the second signal.

In this embodiment, the type identifier of the first device is used to indicate a specific type of the first device, for example, indicate that the first device is of a possible type such as a headset, a mobile phone, a watch, a tablet computer, or a notebook computer. The identifier of the type group in which the first device is located is used to indicate a name obtained after the device is classified based on a specific classification rule. For example, based on a user requirement, the headset and the watch are grouped into one group named a wearable device, and the mobile phone, the tablet computer, and the notebook computer are grouped into one group named a working device. In this embodiment, for an advertising node that sends an advertisement signal, the advertisement signal may indicate an extended advertisement signal sent by the advertising node. The extended advertisement signal may indicate a chain extended advertisement signal or a synchronous extended advertisement signal sent by the advertising node, and a chain extended advertisement signal or a synchronous extended advertisement signal sent by the advertising node may indicate another chain extended advertisement signal or synchronous extended advertisement signal sent by the advertising node. That is, for signals sent by the advertising node, a plurality of signals are associated through the foregoing one-level or multi-level indication. The signal associated with the first signal includes the extended advertisement signal associated through the foregoing one-level indication, and the chain extended advertisement signal or the synchronous extended advertisement signal associated through the foregoing multi-level indication. Whether an advertisement in the advertisement type information is scannable is whether a corresponding extended advertisement signal sent on a universal frequency hopping channel corresponds to a resource for receiving a scan request signal. Whether being connectable is whether a corresponding extended advertisement signal sent on a universal frequency hopping channel corresponds to a resource for receiving an access request signal. Whether the directional information is included is whether a signal to be received by a specific device, a specific type of device, or a device belonging to a specific device group is carried in an extended advertisement signal sent on a universal frequency hopping channel. Whether the non-directional information is included is whether information for which no receiving device is specified is carried in an extended advertisement signal sent on a universal frequency hopping channel.

In another possible implementation, the first control information includes a cyclic redundancy check and at least one of the following information: modulation scheme information of the second part, coding scheme information of the second part, length information of the second part, modulation and coding scheme information of the second part, and third advertisement type information. The third advertisement type information includes at least one of the following information: whether the first device is scannable, whether the first device is connectable, the first signal indicating whether the directional information is included in the first signal and/or the signal associated with the first signal, and the first signal indicating whether the non-directional information is included in the first signal and/or the signal associated with the first signal.

In this embodiment, the cyclic redundancy check in the control information is used by the receiving device to check received information, so that the receiving device can be prevented from incorrectly interpreting the control information. The control information indicates the modulation scheme, the coding scheme, and the length information of the second part, to assist the receiving device in receiving information carried in the second part. In addition, the receiving device may determine, based on the third advertisement type information, whether the receiving device needs to receive the information carried in the second part and/or information associated with the second signal, or the receiving device determines whether to perform mutual discovery or connection with the first device.

In another possible implementation, when the first signal indicates that the directional information is included in the first signal and/or the signal associated with the first signal, the first advertisement information further includes at least one of the following information: an identifier of a destination device, a type identifier of the destination device, an identifier of a type group in which the target device is located, and an identifier of a device group in which the destination device is located. The receiving device determines, by using the foregoing information, whether there is a need to receive the information associated with the first signal, or the receiving device determines, by using the foregoing information, whether to perform mutual discovery or connection with the first device.

In another possible implementation, the second control information includes a cyclic redundancy check and at least one of the following information: modulation scheme information of the second part, coding scheme information of the second part, length information of the second part, modulation and coding scheme information of the second part, and fourth advertisement type information. The fourth advertisement type information includes at least one of the following information: whether the first device is scannable, whether the first device is connectable, the second signal indicating whether the directional information is included in the second signal and/or the signal associated with the second signal, and the second signal indicating whether the non-directional information is included in the second signal and/or the signal associated with the second signal. In this embodiment, the cyclic redundancy check in the control information is used by the receiving device to check received information, so that the receiving device can be prevented from incorrectly interpreting the control information. The control information indicates the modulation scheme, the coding scheme, and the length information of the second part, to assist the receiving device in receiving information carried in the second part. In addition, the receiving device may determine, based on the fourth advertisement type information, whether the receiving device needs to receive the information carried in the second part and/or information associated with the first signal, or the receiving device determines whether to perform mutual discovery or connection with the first device.

In another possible implementation, when the second signal indicates whether the directional information is included in the second signal and/or the signal associated with the second signal, the first extended advertisement information further includes at least one of the following information: an identifier of a destination device, a type identifier of the destination device, an identifier of a type group in which the target device is located, and an identifier of a device group in which the destination device is located. The receiving device determines, by using the foregoing information, whether there is a need to receive the information associated with the second signal, or the receiving device determines, by using the foregoing information, whether to perform mutual discovery or connection with the first device.

In another possible implementation, the first device may further generate a third signal. A modulation type of the third signal is Gaussian frequency-shift keying (GFSK) modulation. The third signal includes second advertisement information. Then, the first device sends the third signal on a second advertisement dedicated frequency hopping channel. In this embodiment, the third signal may be directly not encoded, or may be encoded by using a convolutional code of a code rate ½ and a repetition code, or may be encoded by using a polar code. This is not specifically limited herein. In this embodiment, the first advertisement dedicated frequency hopping channel and the second advertisement dedicated frequency hopping channel may be the same or different, and the first signal and the third signal may carry same information, or may carry different information. In this way, for a low-cost and low-power device, the first device may notify the low-cost and low-power device by sending a signal that uses GFSK modulation; and for a high-capability device, the first device may notify the high-capability device by sending a signal that uses PSK modulation. Therefore, the first device may consider both availability of the low-cost and low-power device and coverage performance of the high-capability device. In this embodiment, the low-cost and low-power device reduces costs and power consumption by eliminating a need to support PSK modulation and demodulation and/or eliminating a need to support polar code encoding and decoding. That is, it may be understood that the low-cost and low-power device is a device that does not have a PSK modulation and demodulation capability and/or a polar code encoding and decoding capability. The high-capability device may be understood as a device that has a PSK modulation and demodulation capability and/or a polar code encoding and decoding capability.

In another possible implementation, after the first device sends the first signal or the second signal, the first device may further receive a scan request signal or an access request signal sent by another device.

In an example solution, the first device detects, on the first advertisement dedicated frequency hopping channel, a first scan request signal whose modulation type is PSK modulation in a receive time window corresponding to the first advertisement information; or the first device detects, on the first advertisement dedicated frequency hopping channel, a first access request signal whose modulation type is PSK modulation in a receive time window corresponding to the first advertisement information. At least one type of information in the first scan request signal is generated through polar code encoding, and at least one type of information in the first access request signal is generated through polar code encoding. In this way, an anti-interference capability of the scan request signal or the access request signal may be improved.

Based on the foregoing solution, the first device detects, on the first advertisement dedicated frequency hopping channel, the first scan request signal in the receive time window corresponding to the first advertisement information, that is, receives the first scan request signal. Then, the first device sends, on the first advertisement dedicated frequency hopping channel and on a first time domain resource, a first scan response signal corresponding to the first scan request signal. The first time domain resource is determined based on any one of a resource for sending the first advertisement information, the receive time window corresponding to the first advertisement information, and a resource for receiving the first scan request signal. A modulation type of the first scan response signal is PSK modulation, and at least one type of information in the first scan response signal is generated through polar code encoding. In this way, an anti-interference capability of the scan response signal may be improved. In this embodiment, the first time domain resource is determined based on any one of the foregoing resources. For example, the first time domain resource may be obtained through calculation based on a rule predefined in a standard and the foregoing resource. For another example, the first time domain resource may be obtained through calculation based on a rule predefined in a standard, a parameter in an advertisement signal and/or an extended advertisement signal, and the foregoing resource.

Based on the foregoing solution, the first device detects, on the first advertisement dedicated frequency hopping channel, the first access request signal in the receive time window corresponding to the first advertisement information, that is, receives the first access request signal. Then, the first device sends, on the first advertisement dedicated frequency hopping channel and on a second time domain resource, a first access response signal corresponding to the first access request signal. The second time domain resource is determined based on any one of a resource for sending the first advertisement information, the receive time window corresponding to the first advertisement information, and a resource for receiving the first access request signal. A modulation type of the first access response signal is PSK modulation, and at least one type of information in the first access response signal is generated through polar code encoding. In this way, an anti-interference capability of the access response signal may be improved. In this embodiment, the second time domain resource is determined based on any one of the foregoing resources. For example, the second time domain resource may be obtained through calculation based on a rule predefined in a standard and the foregoing resource. For another example, the second time domain resource may be obtained through calculation based on a rule predefined in a standard, a parameter in an advertisement signal and/or an extended advertisement signal, and the foregoing resource.

In another example solution, the first device detects, on the universal frequency hopping channel, a second scan request signal whose modulation type is PSK modulation in a receive time window corresponding to the first extended advertisement information; or the first device detects, on the universal frequency hopping channel, a second access request signal whose modulation type is PSK modulation in a receive time window corresponding to the first extended advertisement information. At least one type of information in the second scan request signal is generated through polar code encoding, and at least one type of information in the second access request signal is generated through polar code encoding. In this way, an anti-interference capability of the scan request signal or the access request signal may be improved.

Based on the foregoing solution, the first device detects, on the universal frequency hopping channel, the second scan request signal in the receive time window corresponding to the first extended advertisement information, that is, receives the second scan request signal. Then, the first device sends, on a third time domain resource, a second scan response signal corresponding to the second scan request signal. The third time domain resource is determined based on any one of a resource for sending the first extended advertisement information, the receive time window corresponding to the first extended advertisement information, and a resource for receiving the second scan request signal. A modulation type of the second scan response signal is PSK modulation, and at least one type of information in the second scan response signal is generated through polar code encoding. In this way, an anti-interference capability of the scan response signal may be improved. In this embodiment, the third time domain resource is determined based on any one of the foregoing resources. For example, the third time domain resource may be obtained through calculation based on a rule predefined in a standard and the foregoing resource. For another example, the third time domain resource may be obtained through calculation based on a rule predefined in a standard, a parameter in an advertisement signal and/or an extended advertisement signal, and the foregoing resource.

Based on the foregoing solution, the first device detects, on the universal frequency hopping channel, the second access request signal in the receive time window corresponding to the first extended advertisement information, that is, receives the second access request signal. Then, the first device sends, on a fourth time domain resource, a second access response signal corresponding to the second access request signal. The fourth time domain resource is determined based on any one of a resource for sending the first extended advertisement information, the receive time window corresponding to the first extended advertisement information, and a resource for receiving the second access request signal. A modulation type of the second access response signal is PSK modulation, and at least one type of information in the second access response signal is generated through polar code encoding. In this way, an anti-interference capability of the access response signal may be improved. In this way, an anti-interference capability of the scan response signal may be improved. In this embodiment, the fourth time domain resource is determined based on any one of the foregoing resources. For example, the fourth time domain resource may be obtained through calculation based on a rule predefined in a standard and the foregoing resource. For another example, the fourth time domain resource may be obtained through calculation based on a rule predefined in a standard, a parameter in an advertisement signal and/or an extended advertisement signal, and the foregoing resource.

According to a second aspect, an embodiment of the present disclosure provides an advertising method, specifically including: A second device detects a first signal on a first advertisement dedicated frequency hopping channel, where the first signal is generated by a first device, a modulation type of the first signal is modulation of a phase shift keying PSK type, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information.

The PSK modulation may be BPSK modulation, QPSK modulation, 8PSK modulation, or one type of PSK modulation specified in a protocol.

In this embodiment, the first device sends the first signal generated through PSK modulation, and the control information in the first signal is generated through polar code encoding. Then, the first device sends the first signal. The PSK modulation scheme may improve receiver sensitivity of the control information at a signal receive end and improve anti-noise and anti-interference performance. Even if a receiving device receives the first signal at a relatively low signal-to-noise ratio, the receiving device can still obtain the control information in the first signal. Therefore, the first signal has relatively strong coverage performance and anti-interference capability. In addition, the advertisement information is used by the first device to notify another device of information about the first device, and the another device determines, based on the first advertisement information, whether to perform discovery with the first device, whether to connect to the first device, or whether to continue to receive a signal associated with the first signal.

In a possible implementation, the first advertisement information may also be encoded by using a polar code. In this way, after the first device sends the first signal, even if the receiving device receives the first signal at a relatively low signal-to-noise ratio, the receiving device can still obtain the advertisement information in the first signal. Therefore, the first signal has relatively strong coverage performance and anti-interference capability.

In another possible implementation, the first advertisement information may further include at least one of the following information: first advertisement type information, an identifier of the first device, a type identifier of the first device, an identifier of a type group in which the first device is located, an identifier of a device group in which the first device is located, a business service requested by the first device, a business service provided by the first device, capability information of the first device, and service data information. The first advertisement type information includes at least one of the following information: whether the first device is scannable, whether the first device is connectable, the first signal indicating whether directional information is included in the first signal and/or a signal associated with the first signal, and the first signal indicating whether non-directional information is included in the first signal and/or the signal associated with the first signal. In this way, the first device may notify another device of information about the first device, and the another device determines, based on the first advertisement information, whether to perform discovery with the first device, whether to connect to the first device, or whether to continue to receive the signal associated with the first signal.

In this embodiment, the type identifier of the first device is used to indicate a specific type of the first device, for example, indicate that the first device is of a possible type such as a headset, a mobile phone, a watch, a tablet computer, or a notebook computer. The identifier of the type group in which the first device is located is used to indicate a name obtained after the device is classified based on a specific classification rule. For example, based on a user requirement, the headset and the watch are grouped into one group named a wearable device, and the mobile phone, the tablet computer, and the notebook computer are grouped into one group named a working device. In this embodiment, for an advertising node that sends an advertisement signal, the advertisement signal may indicate an extended advertisement signal sent by the advertising node. The extended advertisement signal may indicate a chain extended advertisement signal or a synchronous extended advertisement signal sent by the advertising node, and a chain extended advertisement signal or a synchronous extended advertisement signal sent by the advertising node may indicate another chain extended advertisement signal or synchronous extended advertisement signal sent by the advertising node. That is, for signals sent by the advertising node, a plurality of signals are associated through the foregoing one-level or multi-level indication. The signal associated with the first signal includes the extended advertisement signal associated through the foregoing one-level indication, and the chain extended advertisement signal or the synchronous extended advertisement signal associated through the foregoing multi-level indication.

Whether an advertisement in the advertisement type information is scannable is whether a corresponding advertisement signal sent on an advertisement dedicated frequency hopping channel or an extended advertisement signal that is sent on a universal frequency hopping channel resource and that is indicated by the advertisement signal corresponds to a resource for receiving a scan request signal. Whether being connectable is whether a corresponding advertisement signal sent on an advertisement dedicated frequency hopping channel or an extended advertisement signal that is sent on a universal frequency hopping channel resource and that is indicated by the signal corresponds to a resource for receiving an access request signal. Whether the directional information is included is whether a signal to be received by a specific device, a specific type of device, or a device belonging to a specific device group is carried in an advertisement signal sent on an advertisement dedicated frequency hopping channel and/or a signal associated with the signal. Whether the non-directional information is included is whether information for which no receiving device is specified is carried in an advertisement signal sent on an advertisement dedicated frequency hopping channel and/or a signal associated with the advertisement signal.

In this embodiment, one signal "indicates" another signal, including indicating a transmission resource of the another signal, for example, a time domain resource or a frequency domain resource. For example, the advertisement signal may indicate an extended advertisement signal sent by the advertising node, and the advertisement signal may indicate resource information for sending the extended advertisement signal. In this embodiment, a frequency hopping system has a plurality of universal frequency hopping channels, and when sending an extended advertisement signal, the first device may select one universal frequency hopping channel from the plurality of universal frequency hopping channels for sending. If the receiving device subsequently sends feedback information to the first device, the feedback information is also sent on the same universal frequency hopping channel.

In another possible implementation, the second device receives the first signal, and then the second device determines, based on resource information that is for sending a second signal and that is indicated in the first advertisement information of the first signal, to receive the second signal on a universal frequency hopping channel. The second signal is generated by the first device. A modulation type of the second signal is PSK modulation. The second signal sequentially includes a sequence part, a first part, and a second part. The sequence part carries at least one of the following: a predefined sequence, a predefined signal, a preconfigured sequence, and a preconfigured signal. The first part includes second control information encoded by using a polar code. The second part includes first extended advertisement information. The first device sends the second signal generated through PSK modulation, and the control information in the second signal is generated through polar code encoding. Even if the second device receives the second signal at a relatively low signal-to-noise ratio, the second device can still obtain the control information in the second signal. Therefore, the second signal has relatively strong coverage performance and anti-interference capability. In addition, the first device sends the second signal on the universal frequency hopping channel, thereby avoiding congestion on the advertisement dedicated frequency hopping channel, reducing an interference level of the advertisement dedicated frequency hopping channel, and improving reliability of sending an advertisement signal.

In another possible implementation, the first extended advertisement information is encoded by using a polar code. In this way, after the first device sends the first signal, even if the second device receives the first signal at a relatively low signal-to-noise ratio, the second device can still obtain the advertisement information in the first signal. Therefore, the first signal has relatively strong coverage performance and anti-interference capability.

In another possible implementation, the first extended advertisement information further includes at least one of the following information: second advertisement type information, the identifier of the first device, the type identifier of the first device, the identifier of the type group in which the first device is located, the identifier of the device group in which the first device is located, the business service requested by the first device, the business service provided by the first device, the capability information of the first device, and the service data information. The second advertisement type information includes at least one of the following information: whether the first device is scannable, whether the first device is connectable, the second signal indicating whether directional information is included in the second signal and/or a signal associated with the second signal, and the second signal indicating whether non-directional information is included in the second signal and/or the signal associated with the second signal. In this way, the first device may notify another device of information about the first device, and the another device determines, based on the first extended advertisement information, whether to perform discovery with the first device, whether to connect to the first device, or whether to continue to receive the signal associated with the second signal.

In this embodiment, the type identifier of the first device is used to indicate a specific type of the first device, for example, indicate that the first device is of a possible type such as a headset, a mobile phone, a watch, a tablet computer, or a notebook computer. The identifier of the type group in which the first device is located is used to indicate a name obtained after the device is classified based on a specific classification rule. For example, based on a user requirement, the headset and the watch are grouped into one group named a wearable device, and the mobile phone, the tablet computer, and the notebook computer are grouped into one group named a working device. In this embodiment, for an advertising node that sends an advertisement signal, the advertisement signal may indicate an extended advertisement signal sent by the advertising node. The extended advertisement signal may indicate a chain extended advertisement signal or a synchronous extended advertisement signal sent by the advertising node, and a chain extended advertisement signal or a synchronous extended advertisement signal sent by the advertising node may indicate another chain extended advertisement signal or synchronous extended advertisement signal sent by the advertising node. That is, for signals sent by the advertising node, a plurality of signals are associated through the foregoing one-level or multi-level indication. The signal associated with the first signal includes the extended advertisement signal associated through the foregoing one-level indication, and the chain extended advertisement signal or the synchronous extended advertisement signal associated through the foregoing multi-level indication. Whether an advertisement in the advertisement type information is scannable is whether a corresponding extended advertisement signal sent on a universal frequency hopping channel corresponds to a resource for receiving a scan request signal. Whether being connectable is whether a corresponding extended advertisement signal sent on a universal frequency hopping channel corresponds to a resource for receiving an access request signal. Whether the directional information is included is whether a signal to be received by a specific device, a specific type of device, or a device belonging to a specific device group is carried in an extended advertisement signal sent on a universal frequency hopping channel. Whether the non-directional information is included is whether information for which no receiving device is specified is carried in an extended advertisement signal sent on a universal frequency hopping channel.

In another possible implementation, the first control information includes a cyclic redundancy check and at least one of the following information: modulation scheme information of the second part, coding scheme information of the second part, length information of the second part, modulation and coding scheme information of the second part, and third advertisement type information. The third advertisement type information includes at least one of the following information: whether the first device is scannable, whether the first device is connectable, the first signal indicating whether the directional information is included in the first signal and/or the signal associated with the first signal, and the first signal indicating whether the non-directional information is included in the first signal and/or the signal associated with the first signal.

In this embodiment, the cyclic redundancy check in the control information is used by the receiving device to check received information, so that the receiving device can be prevented from incorrectly interpreting the control information. The control information indicates the modulation scheme, the coding scheme, and the length information of the second part, to assist the receiving device in receiving information carried in the second part. In addition, the receiving device may determine, based on the third advertisement type information, whether the receiving device needs to receive the information carried in the second part and/or information associated with the first signal, or the receiving device determines whether to perform mutual discovery or connection with the first device.

In another possible implementation, when the first signal indicates that the directional information is included in the first signal and/or the signal associated with the first signal, the first advertisement information further includes at least one of the following information: an identifier of a destination device, a type identifier of the destination device, an identifier of a type group in which the target device is located, and an identifier of a device group in which the destination device is located. The second device determines, by using the foregoing information, whether there is a need to receive the information associated with the first signal, or the second device determines, by using the foregoing information, whether to perform mutual discovery or connection with the first device.

In another possible implementation, the second control information includes a cyclic redundancy check and at least one of the following information: modulation scheme information of the second part, coding scheme information of the second part, length information of the second part, modulation and coding scheme information of the second part, and fourth advertisement type information. The fourth advertisement type information includes at least one of the following information: whether the first device is scannable, whether the first device is connectable, the second signal indicating whether the directional information is included in the second signal and/or the signal associated with the second signal, and the second signal indicating whether the non-directional information is included in the second signal and/or the signal associated with the second signal. In this embodiment, the cyclic redundancy check in the control information is used by the receiving device to check received information, so that the receiving device can be prevented from incorrectly interpreting the control information. The control information indicates the modulation scheme, the coding scheme, and the length information of the second part, to assist the receiving device in receiving information carried in the second part. In addition, the receiving device may determine, based on the fourth advertisement type information, whether the receiving device needs to receive the information carried in the second part and/or information associated with the first signal, or the receiving device determines whether to perform mutual discovery or connection with the first device.

In another possible implementation, when the second signal indicates whether the directional information is included in the second signal and/or the signal associated with the second signal, the first extended advertisement information further includes at least one of the following information: an identifier of a destination device, a type identifier of the destination device, an identifier of a type group in which the target device is located, and an identifier of a device group in which the destination device is located. The second device determines, by using the foregoing information, whether there is a need to receive the information associated with the second signal, or the second device determines, by using the foregoing information, whether to perform mutual discovery or connection with the first device.

In another possible implementation, the second device detects, on a second advertisement dedicated frequency hopping channel, a third signal sent by the first device, where a modulation type of the third signal is GFSK modulation, and the third signal includes second advertisement information. In this embodiment, the third signal may be directly not encoded, or may be encoded by using a convolutional code of a code rate ½ and a repetition code, or may be encoded by using a polar code. This is not specifically limited herein. In this embodiment, the first advertisement dedicated frequency hopping channel and the second advertisement dedicated frequency hopping channel may be the same or different, and the first signal and the third signal may carry same information, or may carry different information. In this way, for a low-cost and low-power device, the first device may notify the low-cost and low-power device by sending a signal that uses GFSK modulation; and for a high-capability device, the first device may notify the high-capability device by sending a signal that uses PSK modulation. Therefore, the first device may consider both availability of the low-cost and low-power device and coverage performance of the high-capability device. In this embodiment, the low-cost and low-power device reduces costs and power consumption by eliminating a need to support PSK modulation and demodulation and/or eliminating a need to support polar code encoding and decoding. That is, it may be understood that the low-cost and low-power device is a device that does not have a PSK modulation and demodulation capability and/or a polar code encoding and decoding capability. The high-capability device may be understood as a device that has a PSK modulation and demodulation capability and/or a polar code encoding and decoding capability.

In another possible implementation, the second device sends, on the first advertisement dedicated frequency hopping channel, a first scan request signal whose modulation type is PSK modulation on a corresponding sending resource in a receive time window corresponding to the first advertisement information; or the second device sends, on the first advertisement dedicated frequency hopping channel, a first access request signal whose modulation type is PSK modulation on a corresponding sending resource in a receive time window corresponding to the first advertisement information. At least one type of information in the first scan request signal is generated through polar code encoding, and at least one type of information in the first access request signal is generated through polar code encoding. In this way, an anti-interference capability of the scan request signal or the access request signal may be improved.

In another possible implementation, the second device detects, on the first advertisement dedicated frequency hopping channel and in the receive time window corresponding to the first advertisement information, a first scan response signal corresponding to the first scan request signal; or the second device detects, on the first advertisement dedicated frequency hopping channel and in the receive time window corresponding to the first advertisement information, a first access response signal corresponding to the first access request signal. A modulation type of the first scan response signal is PSK modulation, a modulation type of the first access response signal is PSK modulation, at least one type of information in the first scan response signal is generated through polar code encoding, and at least one type of information in the first access response signal is generated through polar code encoding. In this way, an anti-interference capability of the scan response signal or the access response signal may be improved.

In another possible implementation, the second device sends, on the universal frequency hopping channel, a second scan request signal whose modulation type is PSK modulation on a corresponding sending resource in a receive time window corresponding to the first extended advertisement information; or the second device sends, on the universal frequency hopping channel, a second access request signal whose modulation type is PSK modulation on a corresponding sending resource in a receive time window corresponding to the first extended advertisement information. At least one type of information in the second scan request signal is generated through polar code encoding, and at least one type of information in the second access request signal is generated through polar code encoding. In this way, an anti-interference capability of the scan request signal or the access request signal may be improved.

In another possible implementation, the second device detects, on the universal frequency hopping channel and in the receive time window corresponding to the first extended advertisement information, a second scan response signal corresponding to the second scan request signal; or the second device detects, on the universal frequency hopping channel and in the receive time window corresponding to the first extended advertisement information, a second access response signal corresponding to the second access request signal. A modulation type of the second scan response signal is PSK modulation, a modulation type of the second access response signal is PSK modulation, at least one type of information in the second scan response signal is generated through polar code encoding, and at least one type of information in the second access response signal is generated through polar code encoding. In this way, an anti-interference capability of the scan response signal or the access response signal may be improved.

According to a third aspect, the present disclosure provides a communication apparatus. The apparatus has a function of implementing behavior of the first device in the first aspect. The function may be implemented by hardware, or may be implemented by hardware executing corresponding software. The hardware or the software includes one or more modules corresponding to the function.

In a possible implementation, the apparatus includes units or modules configured to perform the steps in the first aspect. For example, the apparatus includes a processing module configured to generate a first signal, where a modulation type of the first signal is modulation of a phase shift keying PSK type, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information; and a sending module configured to send the first signal on a first advertisement dedicated frequency hopping channel.

Optionally, the apparatus further includes a storage module configured to store program instructions and data that are necessary for the communication apparatus.

In a possible implementation, the apparatus includes a processor and a transceiver. The processor is configured to support the first device in performing a corresponding function in the method provided in the first aspect. The transceiver is configured to: indicate communication between the first device and a second device, and send the first signal, the second signal, or the third signal in the foregoing method to the second device. Optionally, the apparatus may further include a memory. The memory is configured to be coupled to the processor, and the memory stores program instructions and data that are necessary for the first device.

According to a fourth aspect, an embodiment of the present disclosure provides a communication apparatus. The apparatus has a function of implementing behavior of the second device in the second aspect. The function may be implemented by hardware, or may be implemented by hardware executing corresponding software. The hardware or the software includes one or more modules corresponding to the function.

In a possible implementation, the apparatus includes units or modules configured to perform the steps in the second aspect. For example, the apparatus includes: a detection module configured to detect a first signal on a first advertisement dedicated frequency hopping channel, where a modulation type of the first signal is modulation of a phase shift keying PSK type, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information.

Optionally, the apparatus further includes a storage module configured to store program instructions and data that are necessary for the communication apparatus.

In a possible implementation, the apparatus includes a processor and a transceiver. The processor is configured to support the second device in performing a corresponding function in the method provided in the second aspect. The transceiver is configured to: indicate communication between the second device and a first device, and send the scan request signal or the access request signal in the foregoing method to the first device. Optionally, the apparatus may further include a memory. The memory is configured to be coupled to the processor, and the memory stores program instructions and data that are necessary for the second device.

According to a fifth aspect, an embodiment of the present disclosure provides a computer-readable storage medium. The computer storage medium stores computer instructions, and the computer instructions are used to perform the method in any possible implementation of any one of the foregoing aspects.

According to a sixth aspect, an embodiment of the present disclosure provides a computer program including instructions. When the computer program is run on a computer, the computer is enabled to perform the method according to any one of the foregoing aspects.

According to a seventh aspect, the present disclosure provides a chip system. The chip system includes a processor configured to support a communication apparatus in implementing functions in the foregoing aspects, for example, generating or processing data and/or information in the foregoing methods. In a possible design, the chip system further includes a memory. The memory is configured to store program instructions and data that are necessary for the communication apparatus, to implement a function in any one of the foregoing aspects. The chip system may include a chip, or may include a chip and another discrete component.

In a possible implementation, when the chip system is run on a first device side, the chip system may support the communication apparatus in performing the method according to the first aspect.

In another possible implementation, when the chip system is run on a second device side, the chip system may support the communication apparatus in performing the method according to the second aspect.

According to an eighth aspect, an embodiment of the present disclosure provides a communication system. The system includes the first device and the second device in the foregoing aspects.

DESCRIPTION OF EMBODIMENTS

To make objectives, technical solutions, and advantages of the present disclosure clearer, the following describes embodiments of the present disclosure with reference to accompanying drawings. It is clear that the described embodiments are merely some but not all of embodiments of the present disclosure. A person of ordinary skill in the art may learn that, as a new application scenario emerges, the technical solutions provided in embodiments of the present disclosure are also applicable to a similar technical problem.

In the specification, claims, and accompanying drawings of the present disclosure, the terms "first", "second", and so on are intended to distinguish between similar objects but do not necessarily indicate a specific order or sequence. It should be understood that the data termed in such a way are interchangeable in proper circumstances so that embodiments described herein can be implemented in other orders than the order illustrated or described herein. Moreover, the terms "include", "have", and any other variants are intended to cover the non-exclusive inclusion, for example, a process, method, system, product, or device that includes a list of steps or modules is not necessarily limited to those expressly listed steps or modules, but may include other steps or modules not expressly listed or inherent to such a process, method, product, or device. Names or numbers of steps in the present disclosure do not mean that the steps in a method procedure need to be performed in a time/logical sequence indicated by the names or numbers. An execution sequence of the steps in the procedure that have been named or numbered can be changed based on a technical objective to be achieved, provided that same or similar technical effects can be achieved.

Figure 1:
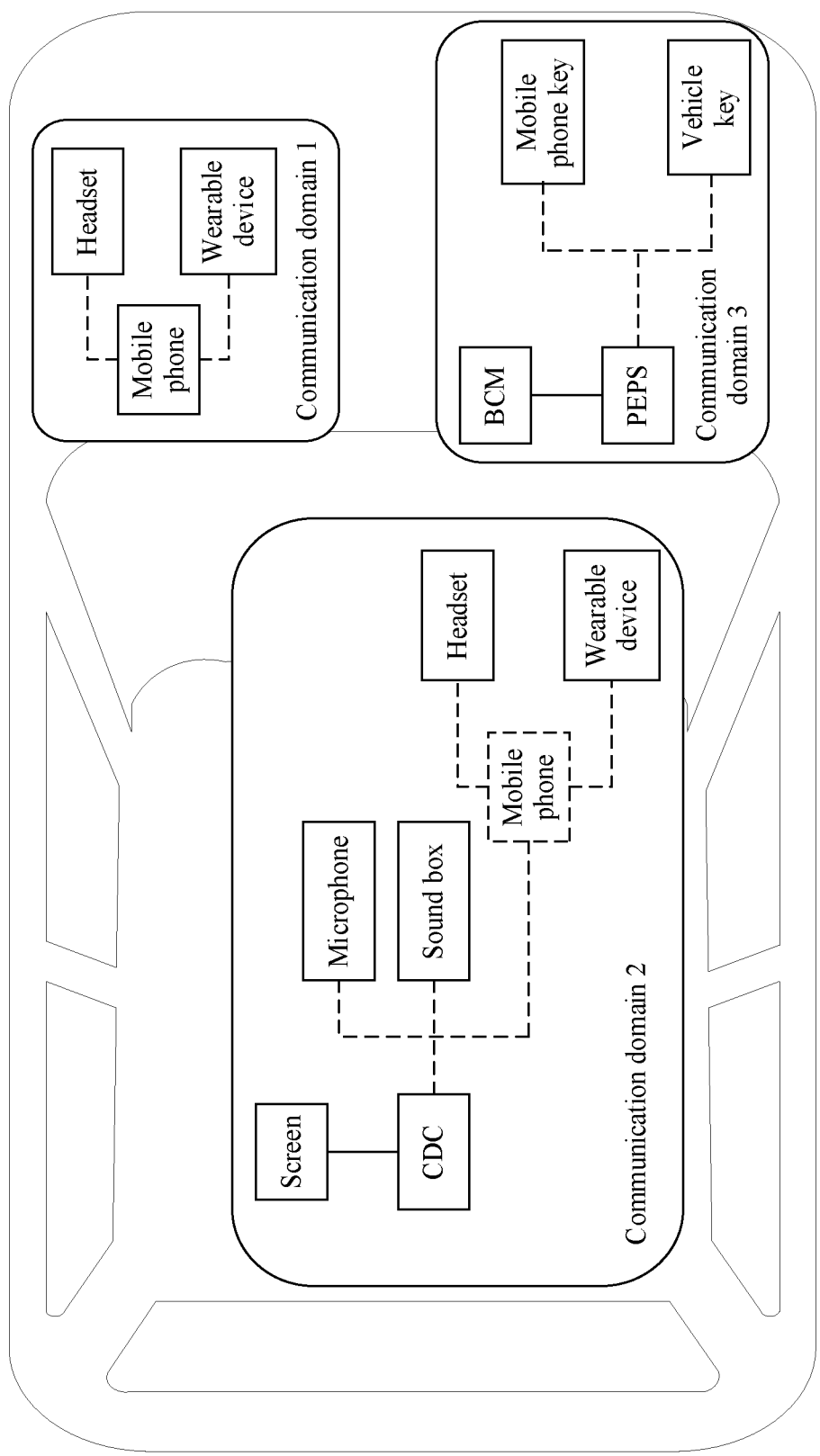
FIG. 1 is a schematic diagram of an advertising application scenario.

In a wireless communication scenario in which smart devices are located, a plurality of communication domains may be included in a specific communication area or range. The communication domain refers to a system including a group of communication nodes having a communication relationship and a communication connection relationship (that is, a communication link) between the communication nodes. One communication domain includes one primary communication node (which may be referred to as a primary node for short) and at least one secondary communication node (which may be referred to as a secondary node for short). The primary node manages a time-frequency resource of the communication domain, and has a function of scheduling a resource for a communication link between communication nodes in the communication domain. An intelligent cockpit wireless communication system is used as an example. For example, a topological relationship of an intra-vehicle communication link is shown in FIG. 1: There are a plurality of communication domains (a communication domain 1, a communication domain 2, and a communication domain 3) in a vehicle, where the communication domain 1 includes a mobile phone, a headset, and a wearable device; the communication domain 2 includes a cockpit domain controller CDC, a screen, a microphone, a sound box, the mobile phone, the headset, and the wearable device; and the communication domain 3 includes a PEPS, a BCM, a mobile phone key, and a vehicle key. It may be understood that each communication domain includes one primary node (also referred to as a G node) and at least one secondary node (also referred to as a T node), where the primary node schedules the secondary node, to implement mutual data transmission between nodes. For example, in the communication domain 1, the mobile phone is a primary node, and the headset and the wearable device are respectively secondary nodes. In the foregoing communication domain, advertisement information is generally used between the primary node and the secondary node to implement functions of mutual discovery, connection, and public data transmission between the devices. After an advertising service is enabled, the devices recurrently send the advertisement information by using an advertising interval as a cycle. To ensure normal operation of the advertising service, currently, there is an urgent need to improve coverage performance and an anti-interference capability of an advertisement signal. As shown in FIG. 1, a same device may be located in a plurality of communication domains at the same time. For example, the mobile phone, the headset, and the wearable device may be classified as the communication domain 1 or the communication domain 2.

To resolve this problem, embodiments of the present disclosure provide the following technical solution: A first device generates a first signal, where a modulation type of the first signal is PSK modulation, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information. Then, the first device sends the first signal on a first advertisement dedicated frequency hopping channel.

Figure 2:
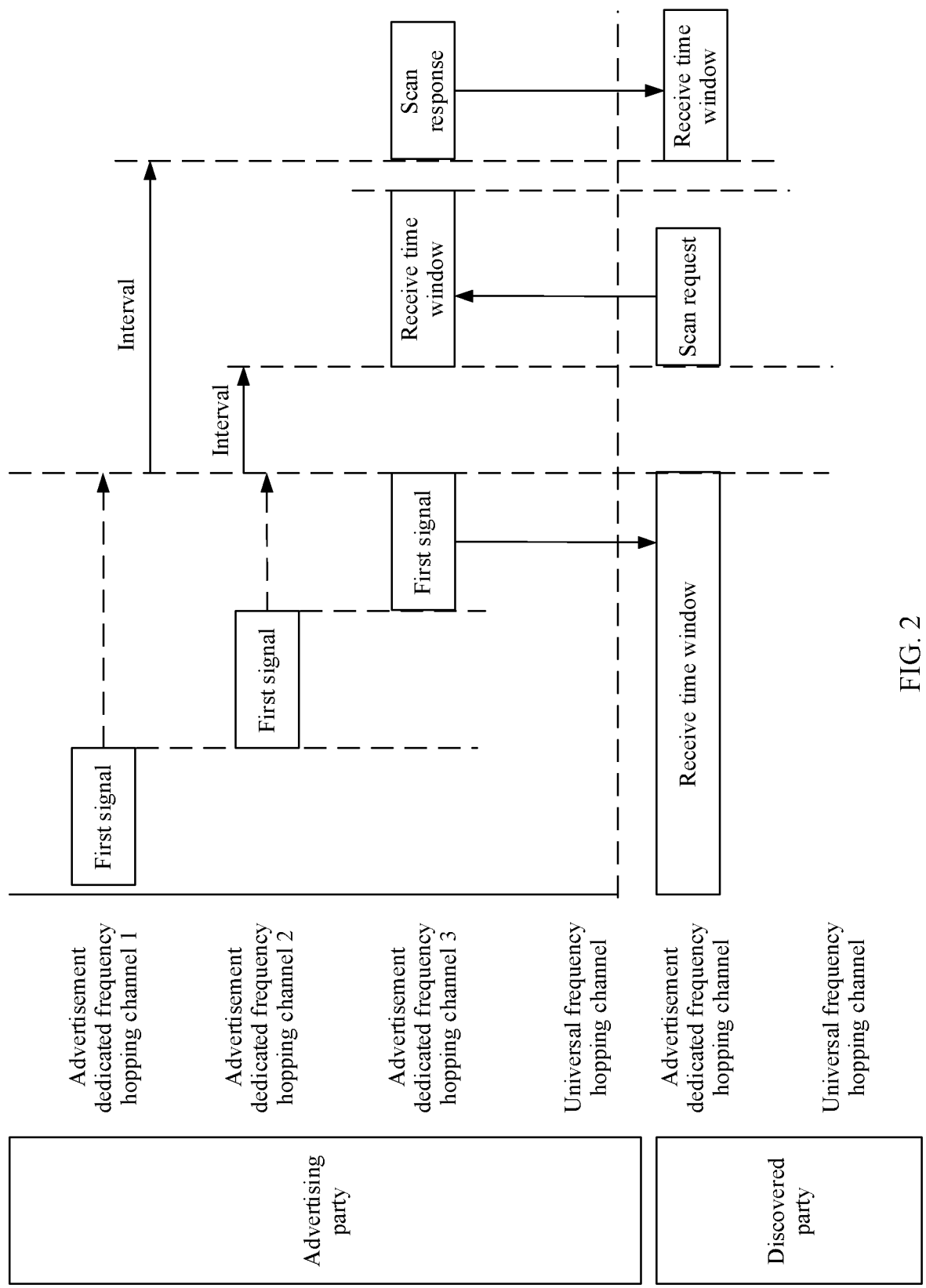
FIG. 2 is a schematic diagram of a device discovery procedure in an advertising method according to an embodiment of the present disclosure.

Specifically, refer to FIG. 2 for a schematic diagram of a device discovery procedure in an advertising method in embodiments of the present disclosure: In this procedure, the first device serves as a discovering party (that is, sends an advertisement signal) to initiate an advertisement; the first device generates an advertisement signal (that is, an advertisement frame), where the advertisement frame is generated through PSK modulation; and then the first device separately sends the advertisement signal on advertisement dedicated frequency hopping channels. It may be understood that the advertisement signal is separately sent on different advertisement dedicated frequency hopping channels in sequence based on a time sequence. For example, there are three advertisement dedicated frequency hopping channels. In this case, the advertisement signal generated by the first device for a first service may be separately sent on the three advertisement dedicated frequency hopping channels in sequence. That is, the advertisement signal is sent on an advertisement dedicated frequency hopping channel 1 at a first moment, the advertisement signal is sent on an advertisement dedicated frequency hopping channel 2 at a second moment, and the advertisement signal is sent on an advertisement dedicated frequency hopping channel 3 at a third moment. There is also at least one second device that serves as a discovered party (that is, receives the advertisement signal). The at least one second device separately detects, in a receive time window of the at least one second device, the advertisement signal sent by the first device. After detecting the advertisement signal sent by the first device, the at least one second device sends a scan request signal or an access request signal to the first device for the advertisement signal. The first device detects, in a receive time window corresponding to the advertisement signal, the scan request signal or the access request signal sent by the second device. Finally, the first device sends a scan response signal for the scan request signal, or the first device sends an access response signal for the access request signal, so that the first device and the at least one second device discover each other or connect to each other.

It may be understood that, if an access process is performed between the first device and the second device, a specific procedure may be similar to the procedure in FIG. 2, except that sent feedback signals are an access request signal and an access response signal.

The technical solutions in embodiments of the present disclosure may be applied to various communication systems, for example, a Global System for Mobile Communications (GSM), a code-division multiple access (CDMA) system, a wideband CDMA (WCDMA) system, a Long-Term Evolution (LTE) system, an LTE frequency-division duplex (FDD) system, an LTE ytime-division duplex (TDD) system, a Universal Mobile Telecommunications System (UMTS), a fifth-generation (5G) communication system, and a future wireless communication system.

In the present disclosure, the first device and the second device may be user equipment, and embodiments are described in the present disclosure with reference to the user equipment. The user equipment (UE) may also be a terminal device, an access terminal, a subscriber unit, a subscriber station, a mobile station, a mobile console, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a wireless local loop (WLL) station, a personal digital assistant (PDA), a handheld device that has a wireless communication function, a computing device, another processing device connected to a wireless modem, a vehicle-mounted device, a wearable device, a terminal device in a 5G network, a terminal device in a future evolved public land mobile network (PLMN), or the like.

The following describes the advertising method in embodiments of the present disclosure with reference to diagrams.

Figure 3:
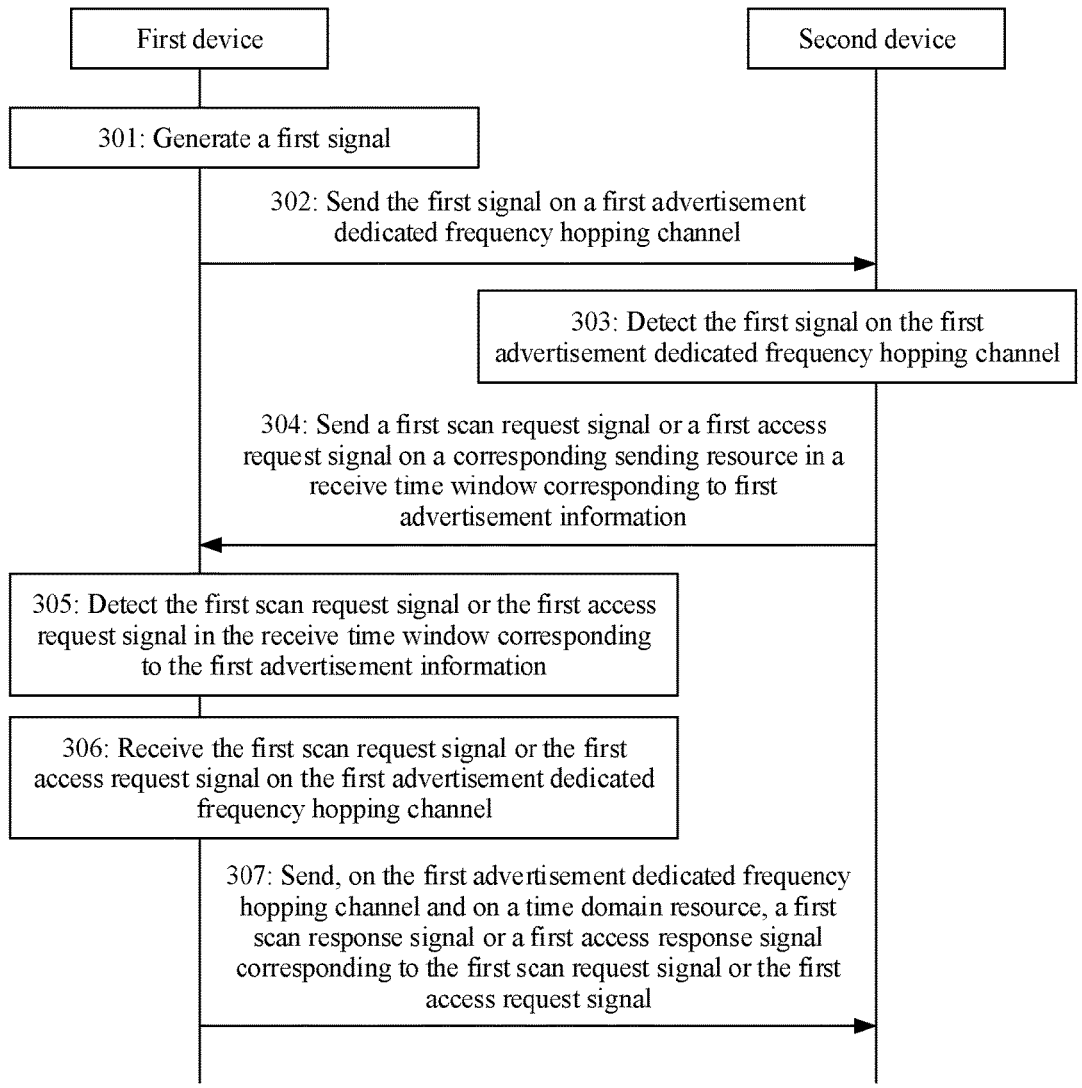
FIG. 3 is a schematic diagram of an embodiment of an advertising method according to an embodiment of the present disclosure.

Specifically, as shown in FIG. 3, that a first device serves as an advertising party and a second device serves as an advertisement receiving party is used for description. An embodiment of the advertising method in embodiments of the present disclosure includes the following steps.

301: The first device generates a first signal.

In this embodiment, the first device generates the first signal based on information such as a device status and a service requirement. A modulation type of the first signal is modulation of a PSK type, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information.

Optionally, the first advertisement information in the first signal may also be encoded by using a polar code. In this way, after the first device sends the first signal, even if a receiving device receives the first signal at a relatively low signal-to-noise ratio, the receiving device can still obtain the advertisement information in the first signal. Therefore, the first signal has relatively strong coverage performance and anti-interference capability.

Optionally, the first advertisement information may further include at least one of the following information: first advertisement type information, an identifier of the first device, a type identifier of the first device, an identifier of a type group in which the first device is located, an identifier of a device group in which the first device is located, a business service requested by the first device, a business service provided by the first device, capability information of the first device, and service data information. The first advertisement type information includes at least one of the following information: whether the first device is scannable, whether the first device is connectable, the first signal indicating whether directional information is included in the first signal and/or a signal associated with the first signal, and the first signal indicating whether non-directional information is included in the first signal and/or the signal associated with the first signal. In this way, the first device may notify another device of information about the first device, and the another device determines, based on the first advertisement information, whether to perform discovery with the first device, whether to connect to the first device, or whether to continue to receive the signal associated with the first signal. In this embodiment, the type identifier of the first device is used to indicate a specific type of the first device, for example, indicate that the first device is of a possible type such as a headset, a mobile phone, a watch, a tablet computer, or a notebook computer. The identifier of the type group in which the first device is located is used to indicate a name obtained after the device is classified based on a specific classification rule. For example, based on a user requirement, the headset and the watch are grouped into one group named a wearable device, and the mobile phone, the tablet computer, and the notebook computer are grouped into one group named a working device. In this embodiment, for an advertising node that sends an advertisement signal, the advertisement signal may indicate an extended advertisement signal sent by the advertising node. The extended advertisement signal may indicate a chain extended advertisement signal or a synchronous extended advertisement signal sent by the advertising node, and a chain extended advertisement signal or a synchronous extended advertisement signal sent by the advertising node may indicate another chain extended advertisement signal or synchronous extended advertisement signal sent by the advertising node. That is, for signals sent by the advertising node, a plurality of signals are associated through the foregoing one-level or multi-level indication. The signal associated with the first signal includes the extended advertisement signal associated through the foregoing one-level indication, and the chain extended advertisement signal or the synchronous extended advertisement signal associated through the foregoing multi-level indication. Whether an advertisement in the advertisement type information is scannable is whether a corresponding advertisement signal sent on an advertisement dedicated frequency hopping channel or an extended advertisement signal that is sent on a universal frequency hopping channel resource and that is indicated by the advertisement signal corresponds to a resource for receiving a scan request signal. Whether being connectable is whether a corresponding advertisement signal sent on an advertisement dedicated frequency hopping channel or an extended advertisement signal that is sent on a universal frequency hopping channel resource and that is indicated by the signal corresponds to a resource for receiving an access request signal. Whether the directional information is included is whether a signal to be received by a specific device, a specific type of device, or a device belonging to a specific device group is carried in an advertisement signal sent on an advertisement dedicated frequency hopping channel and/or a signal associated with the signal. Whether the non-directional information is included is whether information for which no receiving device is specified is carried in an advertisement signal sent on an advertisement dedicated frequency hopping channel and/or a signal associated with the advertisement signal.

In this embodiment, one signal "indicates" another signal, including indicating a transmission resource of the another signal, for example, a time domain resource or a frequency domain resource. For example, the advertisement signal may indicate an extended advertisement signal sent by the advertising node, and the advertisement signal may indicate resource information for sending the extended advertisement signal.

Optionally, the first control information includes a cyclic redundancy check and at least one of the following information: modulation scheme information of the second part, coding scheme information of the second part, length information of the second part, modulation and coding scheme information of the second part, and third advertisement type information. The third advertisement type information includes at least one of the following information: whether the first device is scannable, whether the first device is connectable, the first signal indicating whether the directional information is included in the first signal and/or the signal associated with the first signal, and the first signal indicating whether the non-directional information is included in the first signal and/or the signal associated with the first signal. In this embodiment, the modulation scheme information of the second part is used to indicate whether the second part uses PSK modulation or another modulation scheme. The coding scheme information of the second part is used to indicate whether the second part uses polar coding or another coding scheme. The modulation and coding scheme information of the second part is used to indicate both a modulation scheme and a coding scheme that are used by the second part (that is, in this embodiment, the modulation scheme and the coding scheme may be separately indicated or jointly indicated). The PSK modulation may be BPSK modulation, QPSK modulation, 8PSK modulation, or one type of PSK modulation specified in a protocol. In this embodiment, the cyclic redundancy check in the control information is used by the receiving device to check received information, so that the receiving device can be prevented from incorrectly interpreting the control information. The control information indicates the modulation scheme, the coding scheme, and the length information of the second part, to assist the receiving device in receiving information carried in the second part. In addition, the receiving device may determine, based on the third advertisement type information, whether the receiving device needs to receive the information carried in the second part and/or information associated with the first signal, or the receiving device determines whether to perform mutual discovery or connection with the first device.

In this embodiment, both the first advertisement information and the first control information may include advertisement type information, and the first advertisement information and the first control information may include same advertisement type information, or may respectively include different advertisement information. This is not specifically limited herein.

Optionally, when the first signal indicates that the directional information is included in the first signal and/or the signal associated with the first signal, the first advertisement information further includes at least one of the following information: an identifier of a destination device, a type identifier of the destination device, an identifier of a type group in which the target device is located, and an identifier of a device group in which the destination device is located. In this way, the receiving device determines, by using the foregoing information, whether there is a need to receive the information associated with the first signal, or the receiving device determines, by using the foregoing information, whether to perform mutual discovery or connection with the first device.

Figure 4:
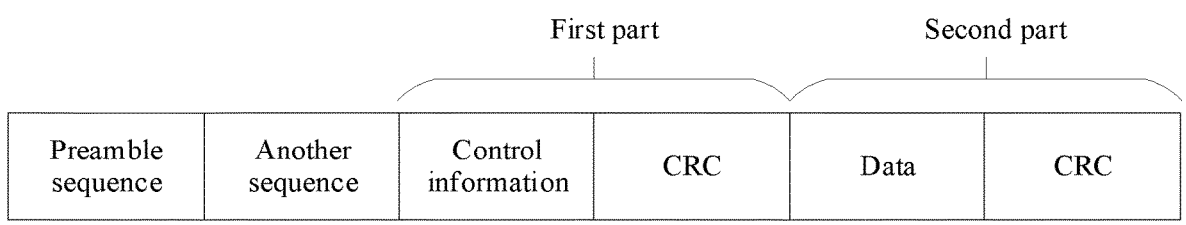
FIG. 4 is a schematic diagram of a format of a first signal according to an embodiment of the present disclosure.

In an example solution, a format of the first signal may be shown in FIG. 4. The first signal includes a preamble sequence, another sequence, control information, a cyclic redundancy check (CRC), data, and a CRC. The control information and the CRC are the first part, and the data and the CRC are the second part (the data part serves as the first advertisement information in the first signal). A length of the preamble sequence is not limited, and the preamble sequence may not be encoded, and may be generated by using a PSK modulation scheme. The another sequence may include an M sequence, a device/link identifier sequence, and a sequence generated through encoding based on a device/link identifier. A length of the another sequence is specified in a protocol, and a specific length is not limited. Whether the another sequence is encoded is not limited, and the another sequence may use any modulation scheme in PSK modulation. The control information includes a modulation and/or coding scheme (code rate) indication of a second coding part, includes a length indication (for example, a length of valid information (including a CRC) before encoding) of the second coding part, or indicates that the second coding part does not exist. A length of the control information is specified in a protocol, and a specific length is not limited. The control information is encoded by using a polar code, and uses a fixed code rate (the code rate may be specified in a protocol). The control information may use any modulation scheme in PSK modulation. The CRC in the first part acts on the control information part. A length of the CRC is specified in a protocol, and a specific length is not limited. The CRC is encoded by using a polar code, and uses a fixed code rate (the code rate may be specified in a protocol). The CRC may use any modulation scheme in PSK modulation. The data part may not include length information, and the length is variable and is not limited. The data part is encoded by using a polar code, and uses a variable code rate (the code rate is indicated by the control information). The data part may use any modulation scheme in PSK modulation, and is indicated by the control information. The CRC in the second part acts on the data part. A length of the CRC is specified in a protocol, and a specific length is not limited. The CRC is encoded by using a polar code, and uses a variable code rate (the code rate is indicated by the control information). The CRC may use any modulation scheme in PSK modulation, and is indicated by the control information.

302: The first device sends the first signal on a first advertisement dedicated frequency hopping channel.

The first device determines an available advertisement dedicated frequency hopping channel, and then selects the first advertisement dedicated frequency hopping channel from the available advertisement dedicated frequency hopping channel to send the first signal. It may be understood that there may be a plurality of first advertisement dedicated frequency hopping channels, or a single first advertisement dedicated frequency hopping channel. For example, advertisement dedicated frequency hopping channels available to the first device include three advertisement dedicated frequency hopping channels. In this case, the first device may send the first signal on an advertisement dedicated frequency hopping channel 1 at a first moment, the first device may send the first signal on an advertisement dedicated frequency hopping channel 2 at a second moment, and the first device may send the first signal on an advertisement dedicated frequency hopping channel 3 at a third moment.

Optionally, if a device discovery or device access process needs to be performed between the first device and the second device, step 303 to step 307 may be further performed in this embodiment. Step 303 to step 307 may be specifically as follows:

303: The second device detects the first signal on the first advertisement dedicated frequency hopping channel.

The second device serves as a receiving device of the first device, and the second device detects, in a window of continuous receiving attempts, each advertisement dedicated frequency hopping channel available to the first device, to determine whether an advertisement signal is detected. If the first device sends the first signal on the first advertisement dedicated frequency hopping channel, the second device may detect the first signal on the first advertisement dedicated frequency hopping channel.

304: The second device sends a first scan request signal or a first access request signal on a corresponding sending resource in a receive time window corresponding to the first advertisement information.

After detecting the first signal, the second device receives the first signal. Then, the second device may generate the first scan request signal or the first access request signal based on information such as a device status and a service requirement. Then, the second device sends the first scan request signal or the first access request signal on the corresponding sending resource in the receive time window corresponding to the first advertisement information.

It may be understood that the corresponding sending resource in the receive time window corresponding to the first advertisement information may be predefined in a standard, or may be obtained through calculation based on time domain information of a receiving resource, or may be indicated by the first advertisement information. This is not specifically limited herein.

305: The first device detects the first scan request signal or the first access request signal in the receive time window corresponding to the first advertisement information.

After the first device sends the first signal, the first signal corresponds to a receive time window. In this case, the first device may detect, in the receive time window, whether feedback information is received. That is, after the second device sends the first scan request information for the first signal, the first device detects the first scan request information in the receive time window corresponding to the first advertisement information. In this way, a corresponding receive time window is preconfigured for the sent first signal, so that blind detection may be avoided, thereby reducing complexity in a detection process.

306: The first device receives the first scan request signal or the first access request signal on the first advertisement dedicated frequency hopping channel.

If the first device detects the first scan request signal or the first access request signal in the receive time window, the first device receives the first scan request signal or the first access request signal on the first advertisement dedicated frequency hopping channel.

In this embodiment, to implement better coverage and anti-interference performance, a modulation scheme of the first scan request signal or the first access request signal is PSK modulation, and at least one piece of information in the first scan request signal or the first access request signal is generated through polar code encoding.

307: The first device sends, on the first advertisement dedicated frequency hopping channel and on a first time domain resource, a first scan response signal or a first access response signal corresponding to the first scan request signal or the first access request signal.

After receiving the first scan request signal or the first access request signal, the first device responds to the first scan request signal or the first access request signal, and then the first device generates the first scan response signal or the first access response signal. Finally, the first device sends the first scan response signal or the first access response signal on the first advertisement dedicated frequency hopping channel and on the time domain resource. To implement better coverage and anti-interference performance, a modulation scheme of the first scan response signal or the first access response signal is PSK modulation, and at least one piece of information in the first scan response signal or the first access response signal is generated through polar code encoding.

In this embodiment, the time domain resource is determined based on any one of a resource for sending the first advertisement information, the receive time window corresponding to the first advertisement information, and a resource for receiving the first scan request signal or the first access request signal. A specific manner includes the following possibilities. In a possible implementation, the time domain resource may be obtained through calculation based on a rule predefined in a standard and the foregoing resource. In a possible implementation, the time domain resource may be obtained through calculation based on a rule predefined in a standard, a parameter in an advertisement signal and/or an extended advertisement signal, and the foregoing resource.

Figure 5:
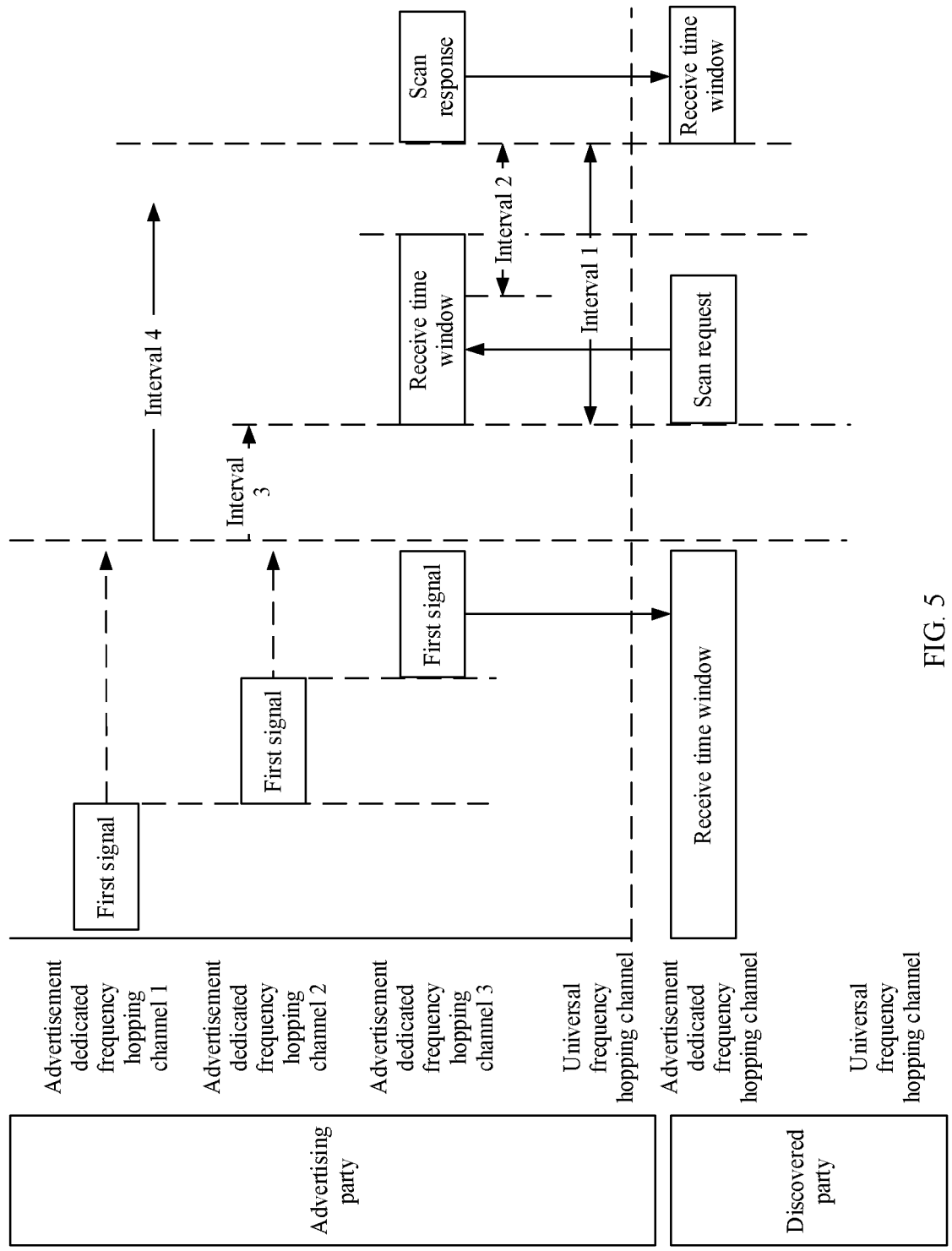
FIG. 5 is a schematic diagram of a resource according to an embodiment of the present disclosure.

A specific case may be shown in FIG. 5.

In a possible implementation, a resource corresponding to a sending resource of an advertisement signal serves as the first time domain resource. A corresponding manner is configured by using an advertisement signal, or is specified in a protocol. For example, an interval 4 shown in FIG. 5 is specified or configured.

In another possible implementation, a resource corresponding to a resource on which the first device detects a scan request serves as the first time domain resource. A corresponding manner is configured by using an advertisement signal, or is specified in a protocol. For example, an interval 1 in FIG. 5 is specified or configured.

In another possible implementation, a resource corresponding to a resource on which the first device receives a scan request signal serves as the first time domain resource.

A corresponding manner is configured by using an advertisement signal, or is specified in a protocol. For example, an interval 2 in FIG. 5 is specified or configured.

In this embodiment, the first device sends the first signal generated through PSK modulation, and the control information in the first signal is generated through polar code encoding. Then, the first device sends the first signal. Even if the receiving device receives the first signal at a relatively low signal-to-noise ratio, the receiving device can still obtain the control information in the first signal. Therefore, the first signal has relatively strong coverage performance and anti-interference capability.

Figure 6:
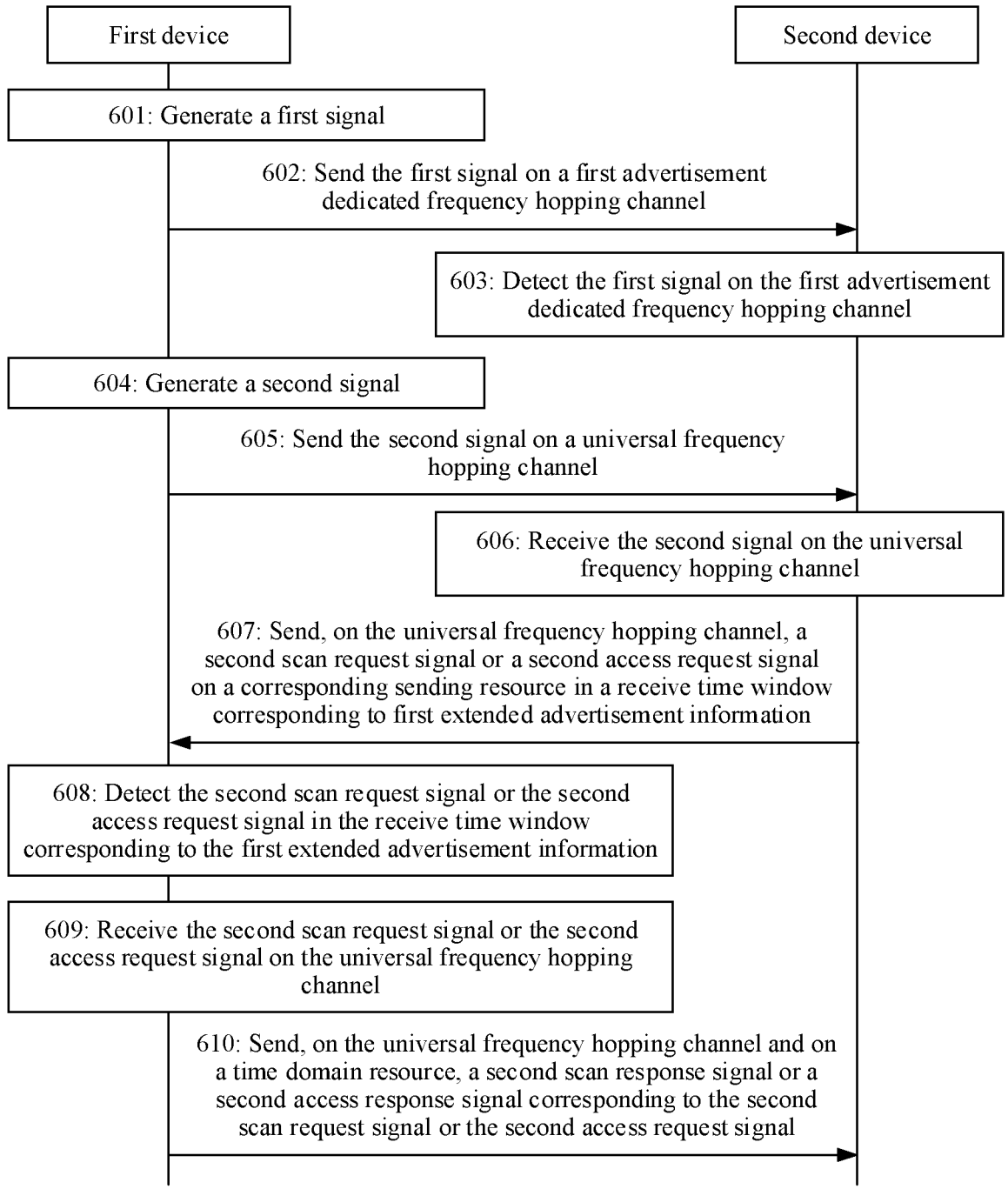
FIG. 6 is a schematic diagram of another embodiment of an advertising method according to an embodiment of the present disclosure.

Specifically, as shown in FIG. 6, a scenario in which a first device serves as an advertising party and a second device serves as an advertisement receiving party is used for description. An embodiment of the advertising method in embodiments of the present disclosure includes the following steps.

Step 601 to step 603 are the same as step 301 to step 303.

604: The first device generates a second signal.

In this embodiment, the first device indicates a sending resource of the second signal by using the first advertisement information of the first signal, and the first device may further generate the second signal. A modulation type of the second signal is PSK modulation. The second signal sequentially includes a sequence part, a first part, and a second part. The sequence part carries at least one of the following: a predefined sequence, a predefined signal, a preconfigured sequence, and a preconfigured signal. The first part includes second control information encoded by using a polar code. The second part includes first extended advertisement information. Then, the first device indicates, by using the first advertisement information, resource information used to send the second signal, and sends the second signal on a universal frequency hopping channel. The first device sends the second signal generated through PSK modulation, and the control information in the second signal is generated through polar code encoding. Then, the first device sends the second signal. Even if the receiving device receives the second signal at a relatively low signal-to-noise ratio, the receiving device can still obtain the control information in the second signal. Therefore, the second signal has relatively strong coverage performance and anti-interference capability. In addition, the first device sends the second signal on the universal frequency hopping channel, thereby avoiding congestion on the advertisement dedicated frequency hopping channel, reducing an interference level of the advertisement dedicated frequency hopping channel, and improving reliability of sending an advertisement signal.

Optionally, the first extended advertisement information is encoded by using a polar code. In this way, after the first device sends the second signal, even if the receiving device receives the second signal at a relatively low signal-to-noise ratio, the receiving device can still obtain the advertisement information in the second signal. Therefore, the second signal has relatively strong coverage performance and anti-interference capability.

Optionally, the first extended advertisement information further includes at least one of the following information: second advertisement type information, the identifier of the first device, the type identifier of the first device, the identifier of the type group in which the first device is located, the identifier of the device group in which the first device is located, the business service requested by the first device, the business service provided by the first device, the capability information of the first device, and the service data information. The second advertisement type information includes at least one of the following information: whether the first device is scannable, whether the first device is connectable, the second signal indicating whether directional information is included in the second signal and/or a signal associated with the second signal, and the second signal indicating whether non-directional information is included in the second signal and/or the signal associated with the second signal. In this way, the first device may notify another device of information about the first device, and the another device determines, based on the first extended advertisement information, whether to perform discovery with the first device, whether to connect to the first device, or whether to continue to receive the signal associated with the second signal.

In this embodiment, the type identifier of the first device is used to indicate a specific type of the first device, for example, indicate that the first device is of a possible type such as a headset, a mobile phone, a watch, a tablet computer, or a notebook computer. The identifier of the type group in which the first device is located is used to indicate a name obtained after the device is classified based on a specific classification rule. For example, based on a user requirement, the headset and the watch are grouped into one group named a wearable device, and the mobile phone, the tablet computer, and the notebook computer are grouped into one group named a working device. In this embodiment, for an advertising node that sends an advertisement signal, the advertisement signal may indicate an extended advertisement signal sent by the advertising node. The extended advertisement signal may indicate a chain extended advertisement signal or a synchronous extended advertisement signal sent by the advertising node, and a chain extended advertisement signal or a synchronous extended advertisement signal sent by the advertising node may indicate another chain extended advertisement signal or synchronous extended advertisement signal sent by the advertising node. That is, for signals sent by the advertising node, a plurality of signals are associated through the foregoing one-level or multi-level indication. The signal associated with the first signal includes the extended advertisement signal associated through the foregoing one-level indication, and the chain extended advertisement signal or the synchronous extended advertisement signal associated through the foregoing multi-level indication. Whether an advertisement in the advertisement type information is scannable is whether a corresponding extended advertisement signal sent on a universal frequency hopping channel corresponds to a resource for receiving a scan request signal. Whether being connectable is whether a corresponding extended advertisement signal sent on a universal frequency hopping channel corresponds to a resource for receiving an access request signal. Whether the directional information is included is whether a signal to be received by a specific device, a specific type of device, or a device belonging to a specific device group is carried in an extended advertisement signal sent on a universal frequency hopping channel. Whether the non-directional information is included is whether information for which no receiving device is specified is carried in an extended advertisement signal sent on a universal frequency hopping channel.

Optionally, the second control information includes a cyclic redundancy check and at least one of the following information: modulation scheme information of the second part, coding scheme information of the second part, length information of the second part, modulation and coding scheme information of the second part, and fourth advertisement type information. The fourth advertisement type information includes at least one of the following information: whether the first device is scannable, whether the first device is connectable, the second signal indicating whether the directional information is included in the second signal and/or the signal associated with the second signal, and the second signal indicating whether the non-directional information is included in the second signal and/or the signal associated with the second signal. In this embodiment, the modulation scheme information of the second part is used to indicate whether the second part uses PSK modulation or another modulation scheme. The coding scheme information of the second part is used to indicate whether the second part uses polar coding or another coding scheme. The modulation and coding scheme information of the second part is used to indicate both a modulation scheme and a coding scheme that are used by the second part (that is, in this embodiment, the modulation scheme and the coding scheme may be separately indicated or jointly indicated). In this embodiment, the cyclic redundancy check in the control information is used by the receiving device to check received information, so that the receiving device can be prevented from incorrectly interpreting the control information. The control information indicates the modulation scheme, the coding scheme, and the length information of the second part, to assist the receiving device in receiving information carried in the second part. In addition, the receiving device may determine, based on the third advertisement type information, whether the receiving device needs to receive the information carried in the second part and/or information associated with the second signal, or the receiving device determines whether to perform mutual discovery or connection with the first device.

In this embodiment, both the first extended advertisement information and the second control information may include advertisement type information, and the first extended advertisement information and the second control information may include same advertisement type information, or may respectively include different advertisement information. This is not specifically limited herein.

Optionally, when the second signal indicates whether the directional information is included in the second signal and/or the signal associated with the second signal, the first extended advertisement information further includes at least one of the following information: an identifier of a destination device, a type identifier of the destination device, an identifier of a type group in which the target device is located, and an identifier of a device group in which the destination device is located. The receiving device determines, by using the foregoing information, whether there is a need to receive the information associated with the second signal, or the receiving device determines, by using the foregoing information, whether to perform mutual discovery or connection with the first device.

605: The first device sends the second signal on a universal frequency hopping channel.

The first device determines a universal frequency hopping channel available to the first device, then determines the sending resource of the second signal based on sending resource information that is used to send the second signal and that is indicated by the first advertisement information in the first signal, and then sends the second signal on the sending resource.

In this embodiment, a frequency hopping system has a plurality of universal frequency hopping channels, and when sending an extended advertisement signal, the first device may select one universal frequency hopping channel from the plurality of universal frequency hopping channels for sending. If the receiving device subsequently sends feedback information to the first device, the feedback information is also sent on the same universal frequency hopping channel.

If the first device only sends the first signal to the second device, and the second device does not need to provide feedback, only step 601 to step 605 may be performed in this solution. If a device discovery or device access process needs to be performed between the first device and the second device, step 606 to step 610 may be further performed in this embodiment. Step 606 to step 610 may be specifically as follows:

606: The second device receives the second signal on the universal frequency hopping channel.

After receiving the first signal, the second device receives the second signal on the universal frequency hopping channel based on the sending resource information that is of the second signal and that is indicated by the first advertisement information in the first signal.

607: The second device sends, on the universal frequency hopping channel, a second scan request signal or a second access request signal on a corresponding sending resource in a receive time window corresponding to the first extended advertisement information.

After detecting the second signal, the second device receives the second signal. Then, the second device may generate the second scan request signal or the second access request signal based on information such as a device status and a service requirement. Then, the second device sends the second scan request signal or the second access request signal on the corresponding sending resource in the receive time window corresponding to the first extended advertisement information.

It may be understood that the corresponding sending resource in the receive time window corresponding to the first extended advertisement information may be predefined in a standard, or may be obtained through calculation based on time domain information of a receiving resource, or may be indicated by the first extended advertisement information. This is not specifically limited herein.

608: The first device detects the second scan request signal or the second access request signal in the receive time window corresponding to the first extended advertisement information.

After the first device sends the second signal, the second signal corresponds to a receive time window. In this case, the first device may detect, in the receive time window, whether feedback information is received. That is, after the second device sends the second scan request information for the second signal, the first device detects the second scan request information in the receive time window corresponding to the first extended advertisement information. In this way, a corresponding receive time window is preconfigured for the sent second signal, so that blind detection may be avoided, thereby reducing complexity in a detection process.

609: The first device receives the second scan request signal or the second access request signal on the universal frequency hopping channel.

If the first device detects the second scan request signal or the second access request signal in the receive time window, the first device receives the second scan request signal or the second access request signal on the universal frequency hopping channel.

In this embodiment, to implement better coverage and anti-interference performance, a modulation scheme of the second scan request signal or the second access request signal is PSK modulation, and at least one piece of information in the second scan request signal or the second access request signal is generated through polar code encoding.

610: The first device sends, on the universal frequency hopping channel and on a third time domain resource, a second scan response signal or a second access response signal corresponding to the second scan request signal or the second access request signal.

After receiving the second scan request signal or the second access request signal, the first device responds to the second scan request signal or the second access request signal, and then the first device generates the second scan response signal or the second access response signal. Finally, the first device sends the second scan response signal or the second access response signal on the universal frequency hopping channel and on the third time domain resource. To implement better coverage and anti-interference performance, a modulation scheme of the second scan response signal or the second access response signal is PSK modulation, and at least one piece of information in the second scan response signal or the second access response signal is generated through polar code encoding.

In this embodiment, the third time domain resource is determined based on any one of a resource for sending the first advertisement information, the receive time window corresponding to the first advertisement information, and a resource for receiving the second scan request signal or the second access request signal. A specific manner includes the following possibilities. In a possible implementation, the time domain resource may be obtained through calculation based on a rule predefined in a standard and the foregoing resource. In a possible implementation, the time domain resource may be obtained through calculation based on a rule predefined in a standard, a parameter in an advertisement signal and/or an extended advertisement signal, and the foregoing resource.

Figure 7:
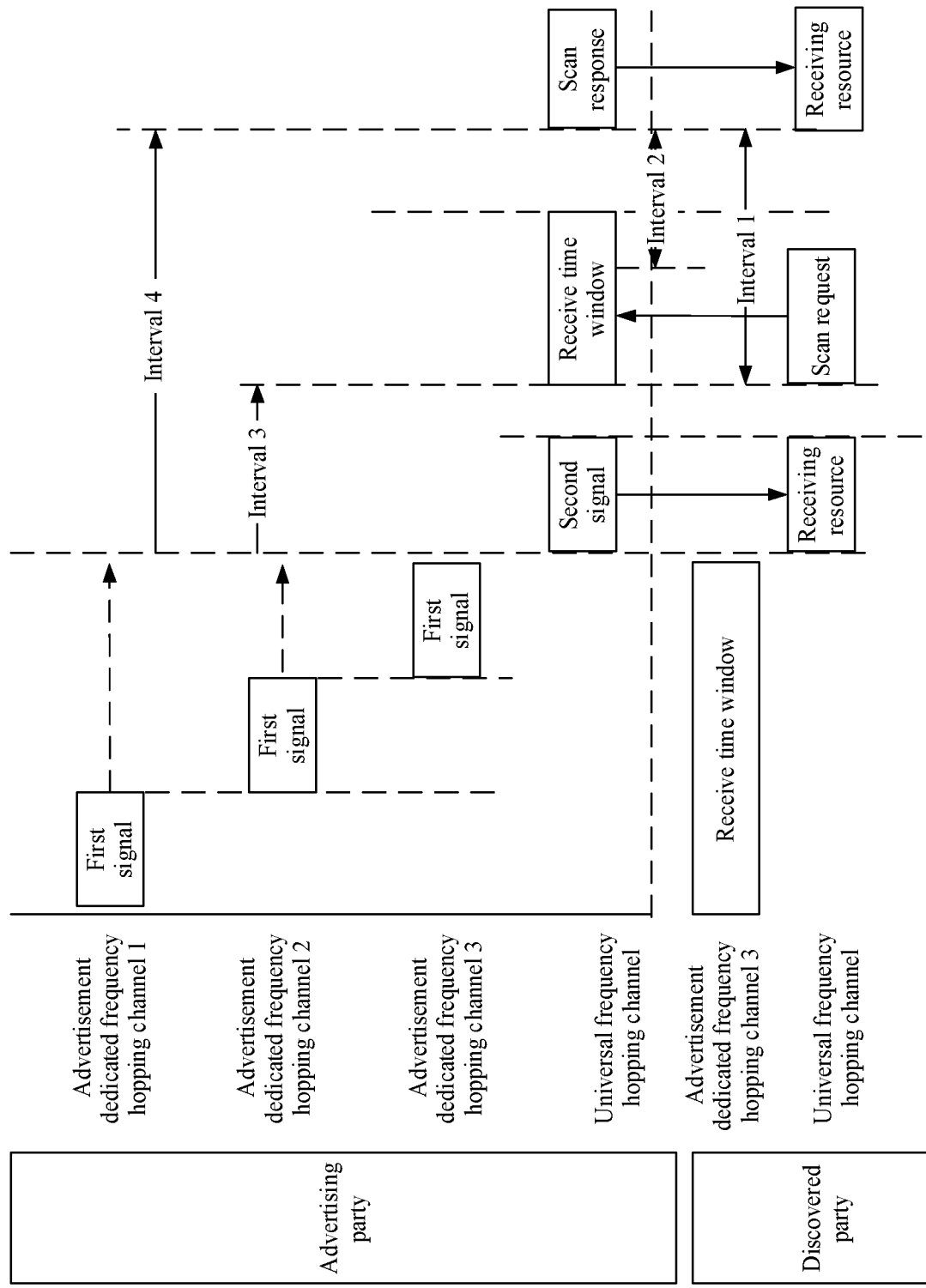
FIG. 7 is another schematic diagram of a resource according to an embodiment of the present disclosure.

A specific case may be shown in FIG. 7.

In a possible implementation, a resource corresponding to a sending resource of an advertisement signal serves as the third time domain resource. A corresponding manner is configured by using an extended advertisement signal, or is specified in a protocol. For example, an interval 4 shown in FIG. 7 is specified or configured.

In another possible implementation, a resource corresponding to a resource on which the first device detects a scan request serves as the third time domain resource. A corresponding manner is configured by using an extended advertisement signal, or is specified in a protocol. For example, an interval 1 shown in FIG. 7 is specified or configured.

In another possible implementation, a resource corresponding to a resource on which the first device receives a scan request signal serves as the third time domain resource. A corresponding manner is configured by using an extended advertisement signal, or is specified in a protocol. For example, an interval 2 shown in FIG. 7 is specified or configured.

In this embodiment, the first device sends the second signal generated through PSK modulation, and the control information in the second signal is generated through polar code encoding. Then, the first device sends the second signal. Even if the receiving device receives the second signal at a relatively low signal-to-noise ratio, the receiving device can still obtain the control information in the second signal. Therefore, the second signal has relatively strong coverage performance and anti-interference capability. In addition, the first device sends the second signal on the universal frequency hopping channel, thereby avoiding congestion on the advertisement dedicated frequency hopping channel, reducing an interference level of the advertisement dedicated frequency hopping channel, and improving reliability of sending an advertisement signal.

Figure 8:
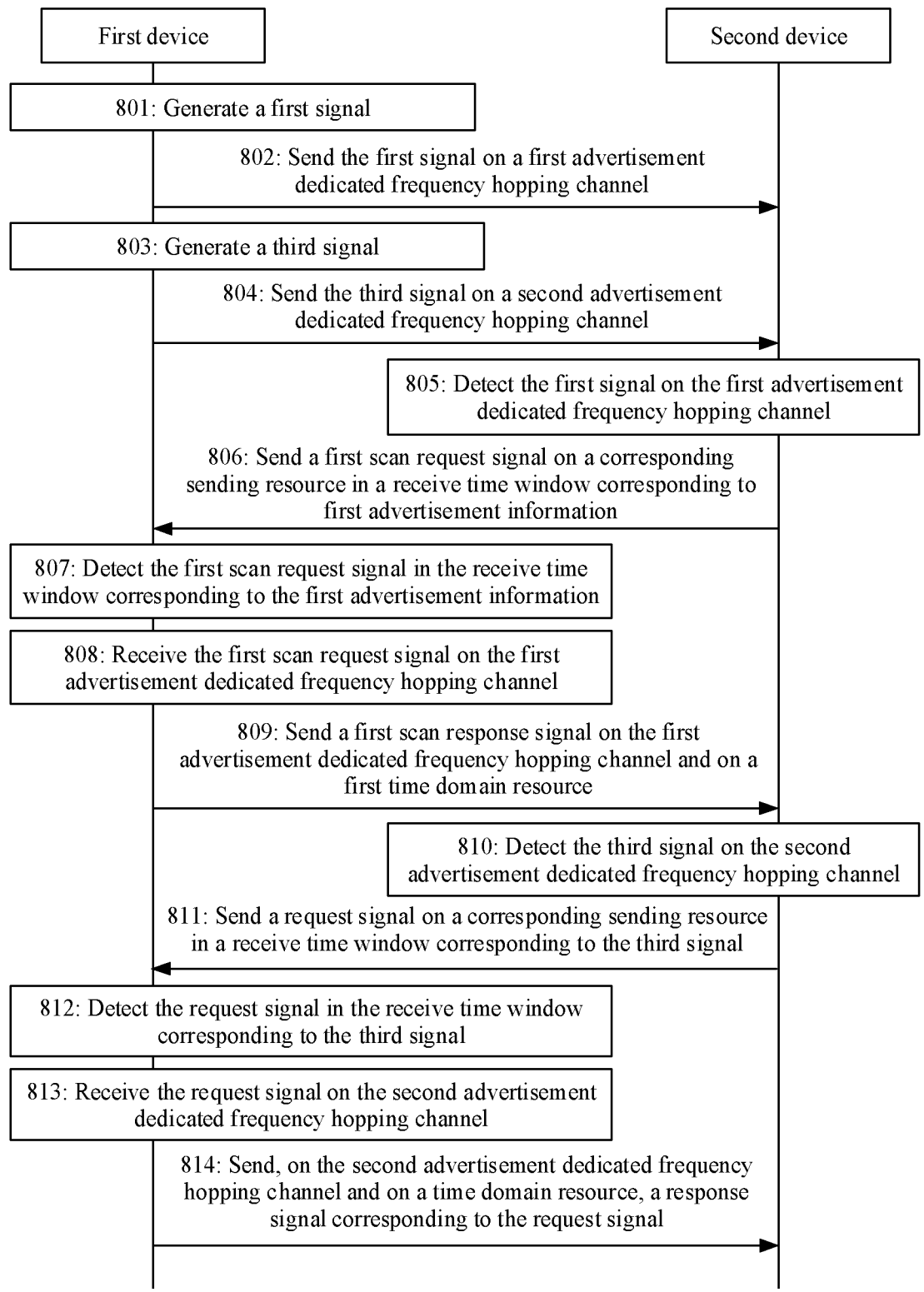
FIG. 8 is a schematic diagram of another embodiment of an advertising method according to an embodiment of the present disclosure.

Specifically, as shown in FIG. 8, a scenario in which a first device serves as an advertising party and a second device serves as an advertisement receiving party, and the second device sends feedback information to the first device is used for description. An embodiment of the advertising method in embodiments of the present disclosure includes the following steps.

Step 801 and step 802 are the same as step 301 and step 302.

803: The first device generates a third signal.

In this embodiment, information carried in the third signal may be the same as or different from information carried in the first signal. That is, an application scenario in which the first device generates the first signal and the third signal may include the following cases:

In a possible implementation, the first device simultaneously generates the first signal and the third signal for a same service requirement.

In a possible implementation, the first device separately generates the first signal and the third signal for different service requirements.

In this embodiment, a modulation scheme of the third signal is GFSK modulation. The third signal may be directly not encoded, or may be encoded by using a convolutional code of a code rate ½ and a repetition code, or may be encoded by using a polar code. This is not specifically limited herein. The first signal and the third signal may carry same information, or may carry different information.

804: The first device sends the third signal on a second advertisement dedicated frequency hopping channel.

In this embodiment, the first advertisement dedicated frequency hopping channel and the second advertisement dedicated frequency hopping channel may be the same or different. Specifically, the following cases may be included, and FIG. 2 is used as an example.

In a possible implementation, the first device sends the first signal on the advertisement dedicated frequency hopping channel 1 at a first moment, and then sends the third signal on the advertisement dedicated frequency hopping channel 1 at a second moment. In this case, the first advertisement dedicated frequency hopping channel and the second advertisement dedicated frequency hopping channel are the same.

In another possible implementation, the first device sends the first signal on the advertisement dedicated frequency hopping channel 1 at the first moment, and then sends the third signal on the advertisement dedicated frequency hopping channel 2 at the second moment. In this case, the first advertisement dedicated frequency hopping channel and the second advertisement dedicated frequency hopping channel are different.

In this way, for a low-cost and low-power device, the first device may notify the low-cost and low-power device by sending a signal that uses GFSK modulation; and for a high-capability device, the first device may notify the high-capability device by sending a signal that uses PSK modulation. Therefore, the first device may consider both availability of the low-cost and low-power device and coverage performance of the high-capability device. In this embodiment, the low-cost and low-power device reduces costs and power consumption by eliminating a need to support PSK modulation and demodulation and/or eliminating a need to support polar code encoding and decoding. That is, it may be understood that the low-cost and low-power device is a device that does not have a PSK modulation and demodulation capability and/or a polar code encoding and decoding capability. The high-capability device may be understood as a device that has a PSK modulation and demodulation capability and/or a polar code encoding and decoding capability.

In this embodiment, there is no time sequence between steps 801 and 802 and steps 803 and 804. A specific time sequence is not limited herein.

If the first device only sends the first signal and the third signal to the second device, and the second device does not need to provide feedback, only step 801 to step 804 may be performed in this solution. If a device discovery or device access process needs to be performed between the first device and the second device, step 805 to step 814 may be further performed in this embodiment. Step 805 to step 814 may be specifically as follows:

Step 805 to step 809 are the same as step 303 to step 307.

810: The second device detects the third signal on the second advertisement dedicated frequency hopping channel.

The second device and the first device are located in a same communication domain. In the communication domain, the second device detects, in a window of continuous receiving attempts, each advertisement dedicated frequency hopping channel in the communication domain, to determine whether an advertisement signal is detected. If the first device sends the third signal on the second advertisement dedicated frequency hopping channel, the second device may detect the third signal on the second advertisement dedicated frequency hopping channel.

811: The second device sends a request signal on a corresponding sending resource in a receive time window corresponding to the third signal.

After detecting the third signal, the second device receives the third signal. Then, the second device may generate the request signal based on information such as a device status and a service requirement. Then, the second device sends the request signal on the corresponding sending resource in the receive time window corresponding to the third signal.

It may be understood that the corresponding sending resource in the receive time window corresponding to the third signal may be predefined in a standard, or may be obtained through calculation based on time domain information of a receiving resource. This is not specifically limited herein.

812: The first device detects the request signal in the receive time window corresponding to the third signal.

After the first device sends the third signal, the third signal corresponds to a receive time window. In this case, the first device may detect, in the receive time window, whether feedback information is received. That is, after the second device sends the request information for the third signal, the first device detects the request information in the receive time window corresponding to the third signal. In this way, a corresponding receive time window is preconfigured for the sent third signal, so that blind detection may be avoided, thereby reducing complexity in a detection process.

813: The first device receives the request signal on the second advertisement dedicated frequency hopping channel.

If the first device detects the request signal in the receive time window, the first device receives the request signal on the second advertisement dedicated frequency hopping channel.

In this embodiment, to implement better coverage and anti-interference performance, a modulation scheme of the request signal is GFSK modulation.

814: The first device sends, on the second advertisement dedicated frequency hopping channel and on a time domain resource, a response signal corresponding to the request signal.

After receiving the request, the first device responds to the request, and then the first device generates the response signal. Finally, the first device sends the response signal on the second advertisement dedicated frequency hopping channel and on the time domain resource. To implement better coverage and anti-interference performance, a modulation scheme of the response signal is GFSK modulation.

In this embodiment, the time domain resource is determined based on any one of a resource for sending the third signal, the receive time window corresponding to the third signal, and a resource for receiving the request signal. In this embodiment, when the time domain resource is determined based on any one of the foregoing resources, the time domain resource may be predefined based on a standard, or may be obtained through calculation based on the foregoing resource.

It may be understood that step 801, step 802, and step 805 to step 809 are a solution, and step 803, step 804, and step 810 to step 814 are a solution. That is, the first device may separately send the signal that uses PSK modulation and the signal that uses GFSK modulation, a device of an advertisement receiving party in the communication domain may select a corresponding signal based on a capability of the device to receive the signal, and the first device separately receives a feedback signal in a corresponding receive time window. In this way, the first device may consider both availability of a low-cost and low-power device and coverage performance of a high-capability device, to meet a plurality of communication requirements in the communication domain.

Although FIG. 8 shows only a solution in which the first device sends the advertisement signal that uses PSK modulation and the advertisement signal that uses GFSK modulation, it may be understood that the first device may alternatively send the advertisement signal and an extended advertisement signal that use PSK modulation, and the advertisement signal and an extended advertisement signal that use GFSK modulation. A specific implementation may be similar to the solutions shown in FIG. 8 and FIG. 6.

Figure 9:
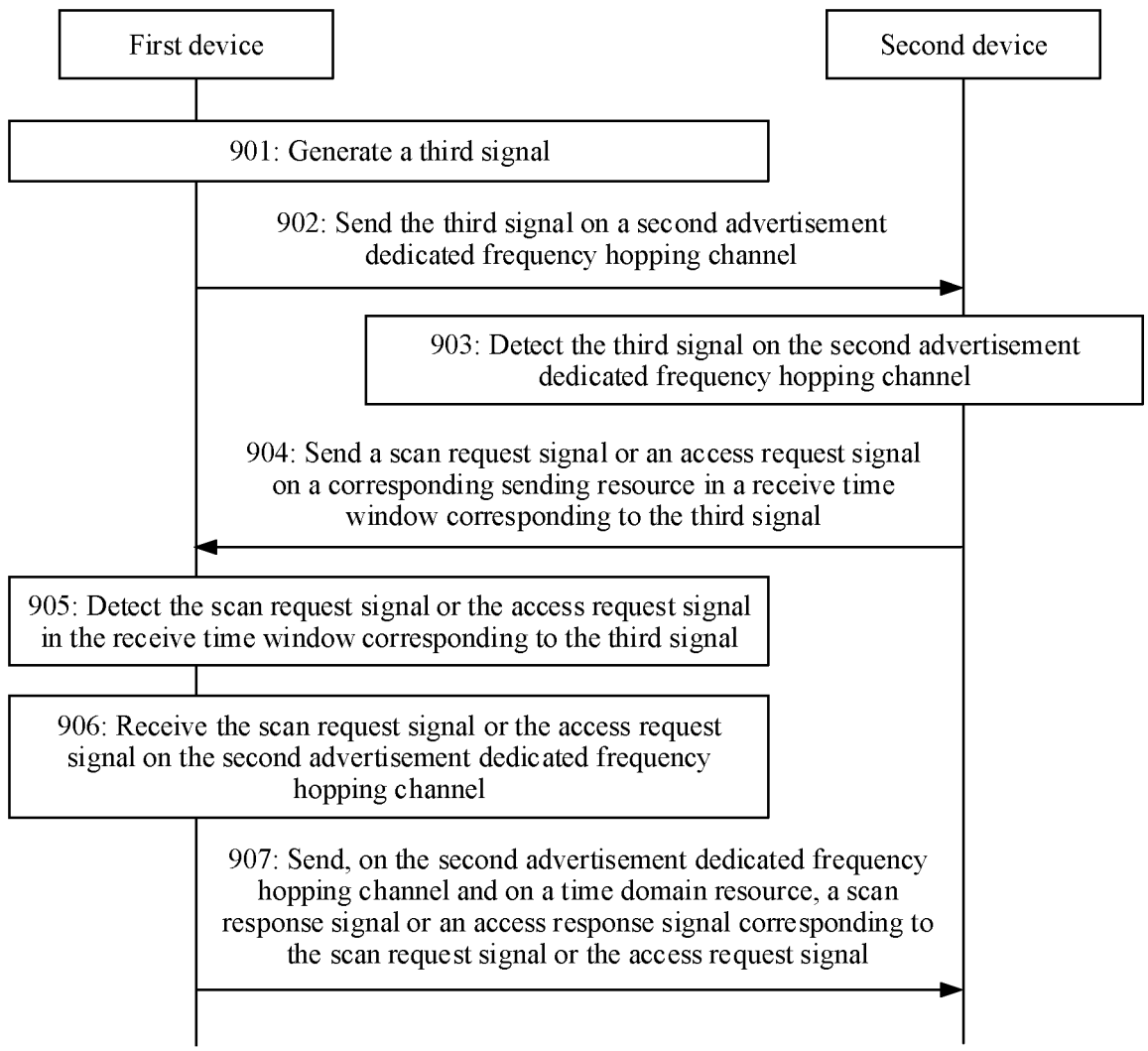
FIG. 9 is a schematic diagram of another embodiment of an advertising method according to an embodiment of the present disclosure.

In the foregoing solution, the first device has a capability of receiving and processing a signal that uses PSK modulation. Therefore, the first device may send the signal that uses PSK modulation, or send the signal that uses PSK modulation and a signal that uses GFSK modulation. If the first device is a device that does not have the capability of receiving and processing a signal that uses PSK modulation, the first device may perform the following solution:

Specifically, as shown in FIG. 9, a scenario in which the first device serves as an advertising party and the second device serves as an advertisement receiving party, and the second device sends feedback information to the first device is used for description. Another embodiment of the advertising method in embodiments of the present disclosure includes the following steps.

901: The first device generates a third signal.

The first device generates the third signal based on information such as a device status and a service requirement. In this embodiment, a modulation scheme of the third signal is GFSK modulation. The third signal may be directly not encoded, or may be encoded by using a convolutional code of a code rate ½ and a repetition code, or may be encoded by using a polar code. This is not specifically limited herein.

902: The first device sends the third signal on a second advertisement dedicated frequency hopping channel.

The first device determines an available advertisement dedicated frequency hopping channel, and then selects the second advertisement dedicated frequency hopping channel from the available advertisement dedicated frequency hopping channel to send the third signal. It may be understood that there may be a plurality of second advertisement dedicated frequency hopping channels, or a single third advertisement dedicated frequency hopping channel. For example, advertisement dedicated frequency hopping channels available to the first device include three advertisement dedicated frequency hopping channels. In this case, the first device may send the third signal on an advertisement dedicated frequency hopping channel 1 at a first moment, the first device may send the third signal on an advertisement dedicated frequency hopping channel 2 at a second moment, and the first device may send the third signal on an advertisement dedicated frequency hopping channel 3 at a third moment.

903: The second device detects the third signal on the second advertisement dedicated frequency hopping channel.

The second device serves as a receiving device of the first device, and the second device detects, in a window of continuous receiving attempts, each advertisement dedicated frequency hopping channel available to the first device, to determine whether an advertisement signal is detected. If the first device sends the third signal on the second advertisement dedicated frequency hopping channel, the second device may detect the third signal on the second advertisement dedicated frequency hopping channel.

904: The second device sends a scan request signal or an access request signal on a corresponding sending resource in a receive time window corresponding to the third signal.

After detecting the third signal, the second device receives the third signal. Then, the second device may generate the scan request signal or the access request signal based on information such as a device status and a service requirement. Then, the second device sends the scan request signal or the access request signal on the corresponding sending resource in the receive time window corresponding to the third signal.

It may be understood that the corresponding sending resource in the receive time window corresponding to the third signal may be predefined in a standard, or may be obtained through calculation based on time domain information of a receiving resource, or may be indicated by advertisement information in the third signal. This is not specifically limited herein.

905: The first device detects the scan request signal or the access request signal in the receive time window corresponding to the third signal.

After the first device sends the third signal, the third signal corresponds to a receive time window. In this case, the first device may detect, in the receive time window, whether feedback information is received. That is, after the second device sends the scan request information for the third signal, the first device detects the scan request information in the receive time window corresponding to the third signal. In this way, a corresponding receive time window is preconfigured for the sent third signal, so that blind detection may be avoided, thereby reducing complexity in a detection process.

906: The first device receives the scan request signal or the access request signal on the second advertisement dedicated frequency hopping channel.

If the first device detects the scan request signal or the access request signal in the receive time window, the first device receives the scan request signal or the access request signal on the second advertisement dedicated frequency hopping channel.

907: The first device sends, on the second advertisement dedicated frequency hopping channel and on a time domain resource, a scan response signal or an access response signal corresponding to the scan request signal or the access request signal.

After receiving the scan request, the first device makes a scan response to the scan request, and then the first device generates the scan response signal or the access response signal. Finally, the first device sends the scan response signal or the access response signal on the second advertisement dedicated frequency hopping channel and on the time domain resource.

In this embodiment, the time domain resource is determined based on any one of a resource for sending the third signal, the receive time window corresponding to the third signal, and a resource for receiving the scan request signal or the access request signal. A specific manner includes the following possibilities. In a possible implementation, the time domain resource may be obtained through calculation based on a rule predefined in a standard and the foregoing resource. In a possible implementation, the time domain resource may be obtained through calculation based on a rule predefined in a standard, a parameter in an advertisement signal and/or an extended advertisement signal, and the foregoing resource.

Figure 10:
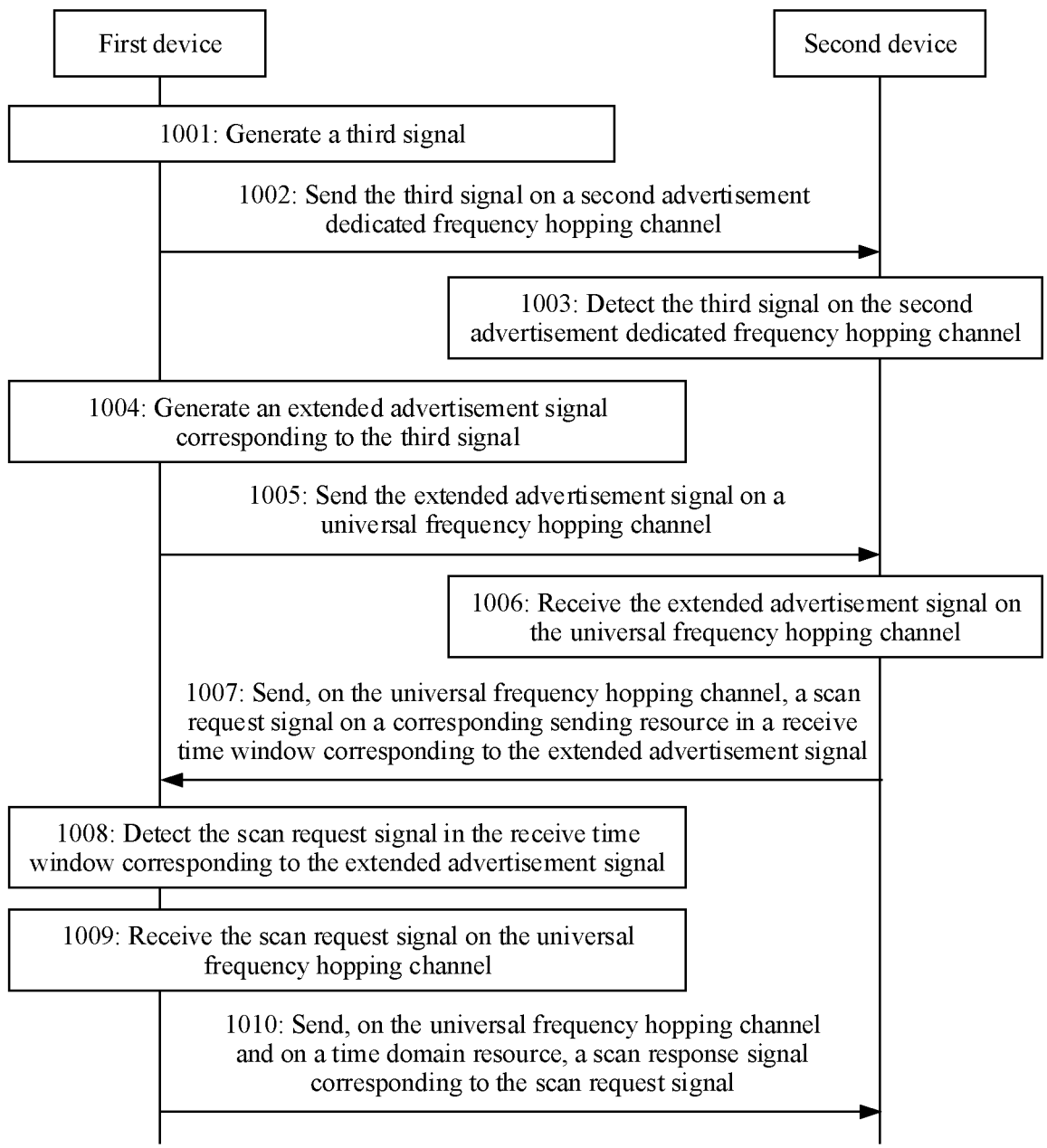
FIG. 10 is a schematic diagram of another embodiment of an advertising method according to an embodiment of the present disclosure.

Specifically, as shown in FIG. 10, a scenario in which the first device serves as an advertising party and the second device serves as an advertisement receiving party, and the second device sends feedback information to the first device is used for description. Another embodiment of the advertising method in embodiments of the present disclosure includes the following steps.

Step 1001 to step 1003 are the same as step 901 to step 903.

1004: The first device generates an extended advertisement signal corresponding to the third signal.

In this embodiment, the first device indicates a sending resource of the extended advertisement signal by using advertisement information of the third signal, and the first device may further generate the extended advertisement signal. In this embodiment, a modulation type of the extended advertisement signal is GFSK modulation. The extended advertisement signal may be directly not encoded, or may be encoded by using a convolutional code of a code rate ½ and a repetition code, or may be encoded by using a polar code. This is not specifically limited herein.

1005: The first device sends the extended advertisement signal on a universal frequency hopping channel.

The first device determines a universal frequency hopping channel available to the first device, then determines the sending resource of the extended advertisement signal based on sending resource information that is used to send the extended advertisement signal and that is indicated by the advertisement information in the third signal, and then sends the extended advertisement signal on the sending resource.

In this embodiment, a frequency hopping system has a plurality of universal frequency hopping channels, and when sending an extended advertisement signal, the first device may select one universal frequency hopping channel from the plurality of universal frequency hopping channels for sending. If the receiving device subsequently sends feedback information to the first device, the feedback information is also sent on the same universal frequency hopping channel.

If the first device only sends the third signal to the second device, and the second device does not need to provide feedback, only step 1001 to step 1005 may be performed in this solution. If a device discovery or device access process needs to be performed between the first device and the second device, step 1006 to step 1010 may be further performed in this embodiment. Step 1006 to step 1010 may be specifically as follows:

1006: The second device receives the extended advertisement signal on the universal frequency hopping channel.

After receiving the third signal, the second device receives the extended advertisement signal on the universal frequency hopping channel based on the sending resource information that is of the extended advertisement signal and that is indicated by the advertisement information in the third signal.

1007: The second device sends, on the universal frequency hopping channel, a scan request signal on a corresponding sending resource in a receive time window corresponding to the extended advertisement signal.

After detecting the extended advertisement signal, the second device receives the extended advertisement signal. Then, the second device may generate the scan request signal based on information such as a device status and a service requirement. Then, the second device sends the scan request signal on the corresponding sending resource in the receive time window corresponding to the extended advertisement signal.

It may be understood that the corresponding sending resource in the receive time window corresponding to the extended advertisement information may be predefined in a standard, or may be obtained through calculation based on time domain information of a receiving resource, or may be indicated by the extended advertisement signal. This is not specifically limited herein.

1008: The first device detects the scan request signal in the receive time window corresponding to the extended advertisement signal.

After the first device sends the extended advertisement signal, the extended advertisement signal corresponds to a receive time window. In this case, the first device may detect, in the receive time window, whether feedback information is received. That is, after the second device sends the scan request information for the extended advertisement signal, the first device detects the scan request information in the receive time window corresponding to the extended advertisement signal. In this way, a corresponding receive time window is preconfigured for the sent extended advertisement signal, so that blind detection may be avoided, thereby reducing complexity in a detection process.

1009: The first device receives the scan request signal on the universal frequency hopping channel.

If the first device detects the scan request signal in the receive time window, the first device receives the scan request signal on the universal frequency hopping channel.

In this embodiment, a modulation scheme of the scan request signal is GFSK modulation.

1010: The first device sends, on the universal frequency hopping channel and on a time domain resource, a scan response signal corresponding to the scan request signal.

After receiving the scan request, the first device responds to the scan request, and then the first device generates the scan response signal. Finally, the first device sends the scan response signal on the universal frequency hopping channel and on the time domain resource. A modulation scheme of the scan response signal is GFSK modulation.

In this embodiment, the time domain resource is determined based on any one of a resource for sending the extended advertisement signal, the receive time window corresponding to the extended advertisement signal, and a resource for receiving the scan request signal. A specific manner includes the following possibilities. In a possible implementation, the time domain resource may be obtained through calculation based on a rule predefined in a standard and the foregoing resource. In a possible implementation, the time domain resource may be obtained through calculation based on a rule predefined in a standard, a parameter in an advertisement signal and/or an extended advertisement signal, and the foregoing resource.

Figure 11:
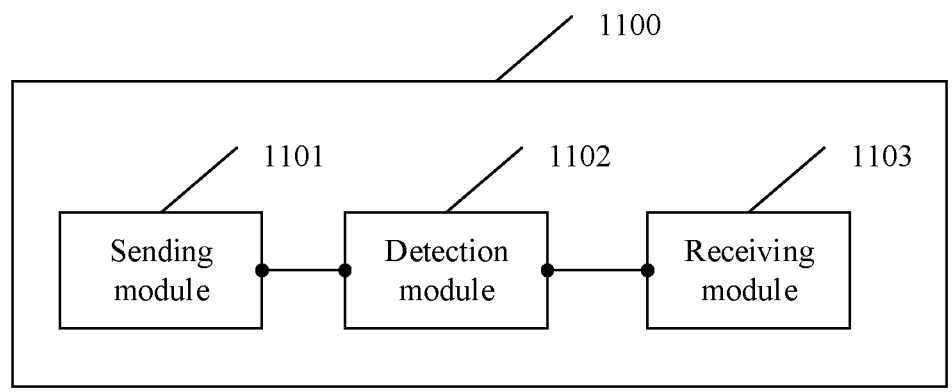
FIG. 11 is a schematic diagram of an embodiment of a communication device according to an embodiment of the present disclosure.

Specifically, as shown in FIG. 11, a communication device 1100 in an embodiment of the present disclosure includes: a sending module 1101 configured to send a first signal on a first advertisement dedicated frequency hopping channel, where a modulation type of the first signal is modulation of a phase shift keying PSK type, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information.

Optionally, the first advertisement information is encoded by using a polar code.

Optionally, the first advertisement information includes at least one of the following information: first advertisement type information, an identifier of a first device, a type identifier of the first device, an identifier of a type group in which the first device is located, an identifier of a device group in which the first device is located, a business service requested by the first device, a business service provided by the first device, capability information of the first device, and service data information.

The first advertisement type information includes at least one of the following information: whether the first device is scannable, whether the first device is connectable, the first signal indicating whether directional information is included in the first signal and/or a signal associated with the first signal, and the first signal indicating whether non-directional information is included in the first signal and/or the signal associated with the first signal.

Optionally, the sending module 1101 is further configured to send a second signal on a universal frequency hopping channel, where a modulation type of the second signal is PSK modulation, and the second signal sequentially includes a sequence part, a first part, and a second part. The sequence part carries at least one of the following: a predefined sequence, a predefined signal, a preconfigured sequence, and a preconfigured signal. The first part includes second control information encoded by using a polar code. The second part includes first extended advertisement information. The first advertisement information indicates resource information used to send the second signal.

Optionally, the first extended advertisement information is encoded by using a polar code.

Optionally, the first extended advertisement information further includes at least one of the following information: second advertisement type information, the identifier of the first device, the type identifier of the first device, the identifier of the type group in which the first device is located, the identifier of the device group in which the first device is located, the business service requested by the first device, the business service provided by the first device, the capability information of the first device, and the service data information. The second advertisement type information includes at least one of the following information: whether the first device is scannable, whether the first device is connectable, the second signal indicating whether directional information is included in the second signal and/or a signal associated with the second signal, and the second signal indicating whether non-directional information is included in the second signal and/or the signal associated with the second signal.

Optionally, the first control information includes a cyclic redundancy check and at least one of the following information: modulation scheme information of the second part, coding scheme information of the second part, length information of the second part, modulation and coding scheme information of the second part, and third advertisement type information. The third advertisement type information includes at least one of the following information: whether the first device is scannable, whether the first device is connectable, the first signal indicating whether the directional information is included in the first signal and/or the signal associated with the first signal, and the first signal indicating whether the non-directional information is included in the first signal and/or the signal associated with the first signal.

Optionally, when the first signal indicates that the directional information is included in the first signal and/or the signal associated with the first signal, the first advertisement information further includes at least one of the following information: an identifier of a destination device, a type identifier of the destination device, an identifier of a type group in which the target device is located, and an identifier of a device group in which the destination device is located.

Optionally, the second control information includes a cyclic redundancy check and at least one of the following information: modulation scheme information of the second part, coding scheme information of the second part, length information of the second part, modulation and coding scheme information of the second part, and fourth advertisement type information. The fourth advertisement type information includes at least one of the following information: whether the first device is scannable, whether the first device is connectable, the second signal indicating whether the directional information is included in the second signal and/or the signal associated with the second signal, and the second signal indicating whether the non-directional information is included in the second signal and/or the signal associated with the second signal.

Optionally, when the second signal indicates whether the directional information is included in the second signal and/or the signal associated with the second signal, the first extended advertisement information further includes at least one of the following information: an identifier of a destination device, a type identifier of the destination device, an identifier of a type group in which the target device is located, and an identifier of a device group in which the destination device is located.

Optionally, the sending module 1101 is further configured to send a third signal on a second advertisement dedicated frequency hopping channel, where a modulation type of the third signal is Gaussian frequency-shift keying GFSK modulation, and the third signal includes second advertisement information.

Optionally, the communication device 1100 further includes a detection module 1102.

The detection module 1102 is configured to detect, on the first advertisement dedicated frequency hopping channel, a first scan request signal whose modulation type is PSK modulation in a receive time window corresponding to the first advertisement information; or the detection module 1102 is configured to detect, on the first advertisement dedicated frequency hopping channel, a first access request signal whose modulation type is PSK modulation in a receive time window corresponding to the first advertisement information.

At least one type of information in the first scan request signal is generated through polar code encoding, and at least one type of information in the first access request signal is generated through polar code encoding.

Optionally, the communication device 1100 further includes a receiving module 1103.

The receiving module 1103 is configured to receive the first scan request signal on the first advertisement dedicated frequency hopping channel.

The sending module 1101 is further configured to send, on the first advertisement dedicated frequency hopping channel and on a first time domain resource, a first scan response signal corresponding to the first scan request signal. The first time domain resource is determined based on any one of a resource for sending the first advertisement information, the receive time window corresponding to the first advertisement information, and a resource for receiving the first scan request signal. A modulation type of the first scan response signal is PSK modulation, and at least one type of information in the first scan response signal is generated through polar code encoding.

Optionally, the communication device 1100 further includes a receiving module 1103.

The receiving module 1103 is configured to receive the first access request signal on the first advertisement dedicated frequency hopping channel.

The sending module 1101 is further configured to send, on the first advertisement dedicated frequency hopping channel and on a second time domain resource, a first access response signal corresponding to the first access request signal. The second time domain resource is determined based on any one of a resource for sending the first advertisement information, the receive time window corresponding to the first advertisement information, and a resource for receiving the first access request signal. A modulation type of the first access response signal is PSK modulation, and at least one type of information in the first access response signal is generated through polar code encoding.

Optionally, the communication device 1100 further includes a detection module 1102.

The detection module 1102 is configured to detect, on the universal frequency hopping channel, a second scan request signal whose modulation type is PSK modulation in a receive time window corresponding to the first extended advertisement information; or the detection module 1102 is configured to detect, on the universal frequency hopping channel, a second access request signal whose modulation type is PSK modulation in a receive time window corresponding to the first extended advertisement information. At least one type of information in the second scan request signal is generated through polar code encoding, and at least one type of information in the second access request signal is generated through polar code encoding.

Optionally, the communication device 1100 further includes a receiving module 1103.

The receiving module 1103 is configured to receive the second scan request signal on the universal frequency hopping channel.

The sending module 1101 is configured to send, on the universal frequency hopping channel and on a third time domain resource, a second scan response signal corresponding to the second scan request signal. The third time domain resource is determined based on any one of a resource for sending the first extended advertisement information, the receive time window corresponding to the first extended advertisement information, and a resource for receiving the second scan request signal. A modulation type of the second scan response signal is PSK modulation, and at least one type of information in the second scan response signal is generated through polar code encoding.

Optionally, the communication device 1100 further includes a receiving module 1103.

The receiving module 1103 is configured to receive the second access request signal on the universal frequency hopping channel.

The sending module 1101 is configured to send, on the universal frequency hopping channel and on a fourth time domain resource, a second access response signal corresponding to the second access request signal. The fourth time domain resource is determined based on any one of a resource for sending the first extended advertisement information, the receive time window corresponding to the first extended advertisement information, and a resource for receiving the second access request signal. A modulation type of the second access response signal is PSK modulation, and at least one type of information in the second access response signal is generated through polar code encoding.

It should be understood that a procedure performed between modules of the first device in the embodiment corresponding to FIG. 11 is similar to the procedure performed by the first device in the method embodiments corresponding to FIG. 3 to FIG. 10.

Further, as shown in FIG. 11, in this embodiment of the present disclosure, the communication device 1100 includes: the detection module 1102 configured to detect a first signal on a first advertisement dedicated frequency hopping channel, where a modulation type of the first signal is modulation of a phase shift keying PSK type, and the first signal sequentially includes a sequence part, a first part, and a second part; the sequence part includes at least one of a predefined sequence, a predefined signal, a preconfigured sequence, and a preconfigured signal; the first part includes first control information encoded by using a polar code; and the second part includes first advertisement information.

Optionally, the first advertisement information is encoded by using a polar code.

Optionally, the first advertisement information includes at least one of the following information: first advertisement type information, an identifier of the first device, a type identifier of the first device, an identifier of a type group in which the first device is located, an identifier of a device group in which the first device is located, a business service requested by the first device, a business service provided by the first device, capability information of the first device, and service data information. The first advertisement type information includes at least one of the following information: whether the first device is scannable, whether the first device is connectable, the first signal indicating whether directional information is included in the first signal and/or a signal associated with the first signal, and the first signal indicating whether non-directional information is included in the first signal and/or the signal associated with the first signal.

The communication device 1100 further includes the receiving module 1103.

The receiving module 1103 is configured to: receive the first signal, and receive a second signal on a universal frequency hopping channel, where a modulation type of the second signal is PSK modulation, and the second signal sequentially includes a sequence part, a first part, and a second part. The sequence part carries at least one of the following: a predefined sequence, a predefined signal, a preconfigured sequence, and a preconfigured signal. The first part includes second control information encoded by using a polar code. The second part includes first extended advertisement information. The first advertisement information indicates resource information used to send the second signal.

Optionally, the first extended advertisement information is encoded by using a polar code.

Optionally, the first extended advertisement information further includes at least one of the following information: second advertisement type information, the identifier of the first device, the type identifier of the first device, the identifier of the type group in which the first device is located, the identifier of the device group in which the first device is located, the business service requested by the first device, the business service provided by the first device, the capability information of the first device, and the service data information. The second advertisement type information includes at least one of the following information: whether the first device is scannable, whether the first device is connectable, the second signal indicating whether directional information is included in the second signal and/or a signal associated with the second signal, and the second signal indicating whether non-directional information is included in the second signal and/or the signal associated with the second signal.

Optionally, the first control information includes a cyclic redundancy check and at least one of the following information: modulation scheme information of the second part, coding scheme information of the second part, length information of the second part, modulation and coding scheme information of the second part, and third advertisement type information. The third advertisement type information includes at least one of the following information: whether the first device is scannable, whether the first device is connectable, the first signal indicating whether the directional information is included in the first signal and/or the signal associated with the first signal, and the first signal indicating whether the non-directional information is included in the first signal and/or the signal associated with the first signal.

Optionally, when the first signal indicates that the directional information is included in the first signal and/or the signal associated with the first signal, the first advertisement information further includes at least one of the following information: an identifier of a destination device, a type identifier of the destination device, an identifier of a type group in which the target device is located, and an identifier of a device group in which the destination device is located.

Optionally, the second control information includes a cyclic redundancy check and at least one of the following information: modulation scheme information of the second part, coding scheme information of the second part, length information of the second part, modulation and coding scheme information of the second part, and fourth advertisement type information. The fourth advertisement type information includes at least one of the following information: whether the first device is scannable, whether the first device is connectable, the second signal indicating whether the directional information is included in the second signal and/or the signal associated with the second signal, and the second signal indicating whether the non-directional information is included in the second signal and/or the signal associated with the second signal.

Optionally, when the second signal indicates whether the directional information is included in the second signal and/or the signal associated with the second signal, the first extended advertisement information further includes at least one of the following information: an identifier of a destination device, a type identifier of the destination device, an identifier of a type group in which the target device is located, and an identifier of a device group in which the destination device is located.

Optionally, the detection module 1102 is further configured to detect a third signal on a second advertisement dedicated frequency hopping channel, where a modulation type of the third signal is Gaussian frequency-shift keying GFSK modulation, and the third signal includes second advertisement information.

Optionally, the communication device 1100 further includes the sending module 1101. The sending module 1101 is further configured to send, on the first advertisement dedicated frequency hopping channel, a first scan request signal whose modulation type is PSK modulation on a corresponding sending resource in a receive time window corresponding to the first advertisement information; or the sending module 1101 is further configured to send, on the first advertisement dedicated frequency hopping channel, a first access request signal whose modulation type is PSK modulation on a corresponding sending resource in a receive time window corresponding to the first advertisement information. At least one type of information in the first scan request signal is generated through polar code encoding, and at least one type of information in the first access request signal is generated through polar code encoding.

Optionally, the detection module 1102 is further configured to detect, on the first advertisement dedicated frequency hopping channel and in the receive time window corresponding to the first advertisement information, a first scan response signal corresponding to the first scan request signal; or the detection module 1102 is further configured to detect, on the first advertisement dedicated frequency hopping channel and in the receive time window corresponding to the first advertisement information, a first access response signal corresponding to the first access request signal. A modulation type of the first scan response signal is PSK modulation, a modulation type of the first access response signal is PSK modulation, at least one type of information in the first scan response signal is generated through polar code encoding, and at least one type of information in the first access response signal is generated through polar code encoding.

Optionally, the communication device 1100 further includes the sending module 1101.

The sending module 1101 is configured to send, on the universal frequency hopping channel, a second scan request signal whose modulation type is PSK modulation on a corresponding sending resource in a receive time window corresponding to the first extended advertisement information; or the sending module 1101 is configured to send, on the universal frequency hopping channel, a second access request signal whose modulation type is PSK modulation on a corresponding sending resource in a receive time window corresponding to the first extended advertisement information. At least one type of information in the second scan request signal is generated through polar code encoding, and at least one type of information in the second access request signal is generated through polar code encoding.

Optionally, the detection module 1102 is further configured to detect, on the universal frequency hopping channel and in the receive time window corresponding to the first extended advertisement information, a second scan response signal corresponding to the second scan request signal; or the detection module 1102 is further configured to detect, on the universal frequency hopping channel and in the receive time window corresponding to the first extended advertisement information, a second access response signal corresponding to the second access request signal. A modulation type of the second scan response signal is PSK modulation, a modulation type of the second access response signal is PSK modulation, at least one type of information in the second scan response signal is generated through polar code encoding, and at least one type of information in the second access response signal is generated through polar code encoding.

It should be understood that a procedure performed between modules of the second device in the embodiment corresponding to FIG. 11 is similar to the procedure performed by the second device in the method embodiments corresponding to FIG. 3 to FIG. 10.

Figure 12:
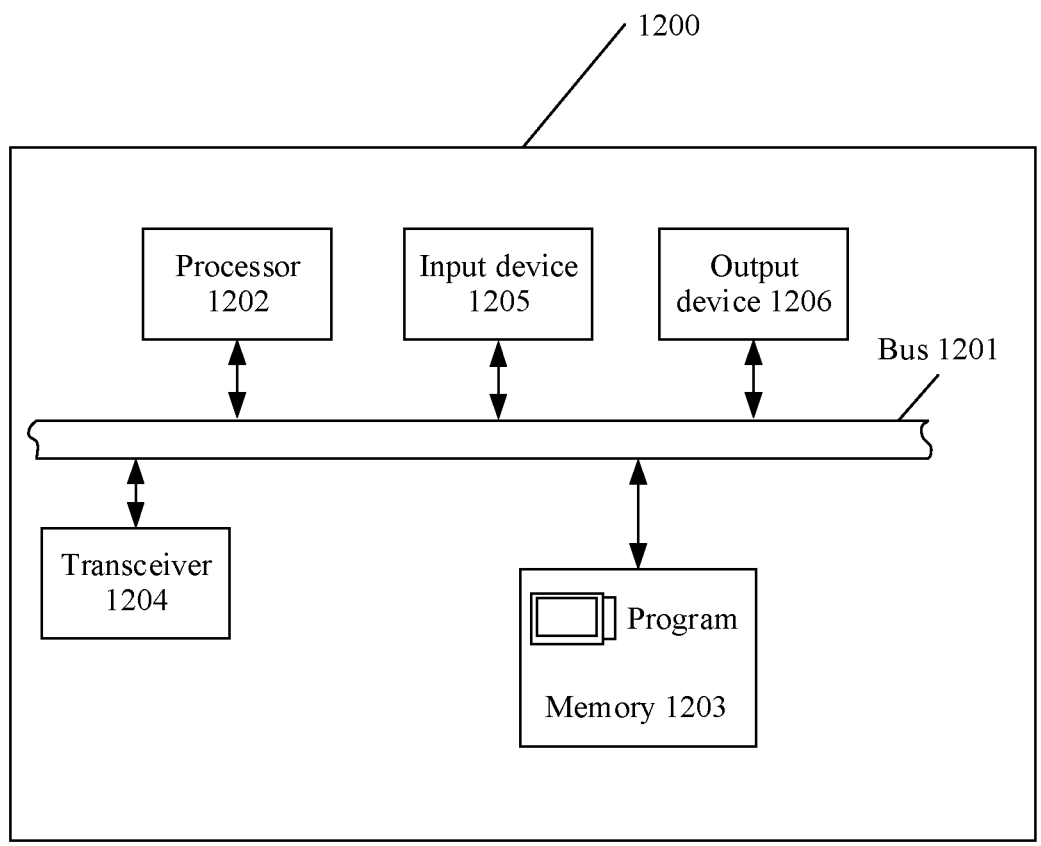
FIG. 12 is a schematic diagram of another embodiment of a communication device according to an embodiment of the present disclosure.

FIG. 12 is a schematic diagram of a possible structure of a communication device 1200 in the foregoing embodiment. The communication device 1200 may be configured as the foregoing first device or second device. The communication device 1200 may include a processor 1202, a computer-readable storage medium/memory 1203, and a transceiver 1204, or may further include an input device 1205, an output device 1206, and a bus 1201. The processor, the transceiver, the computer-readable storage medium, and the like are connected by using the bus. A specific connection medium between the foregoing components is not limited in this embodiment of the present disclosure.

The transceiver 1204 and the processor 1202 may implement corresponding steps implemented by the first device or the second device in any one of the embodiments in FIG. 3 to FIG. 10.

It may be understood that FIG. 12 shows only a simplified design of the communication device. In actual application, the communication device may include any quantities of transceivers, processors, memories, and the like, and all communication devices that can implement the present disclosure fall within the protection scope of the present disclosure.

The processor 1202 in the apparatus 1200 may be a general-purpose processor, for example, a central processing unit (CPU), a network processor (NP), or a microprocessor, or may be an application-specific integrated circuit (ASIC), or one or more integrated circuits configured to control program execution of the solutions of the present disclosure. Alternatively, the processor 1202 may be a digital signal processor (DSP), a field-programmable gate array (FPGA), another programmable logic device, a discrete gate, a transistor logic device, or a discrete hardware component. Alternatively, a controller/processor may be a combination of processors implementing a computing function, for example, a combination of one or more microprocessors, or a combination of a DSP and a microprocessor. The processor usually performs logical and arithmetic operations based on program instructions stored in the memory.

The computer-readable storage medium/memory 1203 may further store an operating system and another application program. Specifically, the program may include program code, and the program code includes computer operation instructions. More specifically, the foregoing memory may be a read-only memory (ROM), a static storage device of another type that may store static information and instructions, a random-access memory (RAM), a dynamic storage device of another type that may store information and instructions, a magnetic disk memory, or the like. The memory 1203 may be a combination of the foregoing types of memories. In addition, the computer-readable storage medium/memory may be located in the processor, may be located outside the processor, or may be distributed in a plurality of entities including the processor or a processing circuit. The computer-readable storage medium/memory may be specifically in a computer program product. For example, the computer program product may include a computer-readable medium in a packaging material.

Alternatively, an embodiment of the present disclosure further provides a universal processing system. For example, the universal processing system is usually referred to as a chip. The universal processing system includes one or more microprocessors that provide a processor function, and an external memory that provides at least a part of a storage medium. All these components are connected to another supporting circuit by using an external bus architecture. When instructions stored in the memory are executed by the processor, the processor is enabled to perform some or all of the steps of the first device in the advertising methods in the embodiments in FIG. 3 to FIG. 10, and/or another process used for a technology described in the present disclosure.

In this embodiment, the first device and the second device have a same capability, and have a same specific structure. Therefore, for an apparatus structure of the second device, Method or algorithm steps described in combination with the content disclosed in the present disclosure may be implemented by hardware, or may be implemented by a processor by executing software instructions. The software instructions may include a corresponding software module. The software module may be stored in a ROM, a RAM, a flash memory, an erasable programmable ROM (EPROM), an electrically erasable programmable ROM (EEPROM), a register, a hard disk, a removable hard disk, a compact disc ROM (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in a terminal. Certainly, the processor and the storage medium may alternatively exist in the first device as discrete components.

It may be clearly understood by a person skilled in the art that, for the purpose of convenient and brief description, for a detailed working process of the foregoing system, apparatus, and unit, refer to a corresponding process in the foregoing method embodiments.

In the several embodiments provided in the present disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, each of the units may exist alone physically, or two or more units are integrated into one unit. The integrated unit may be implemented in a form of hardware, or may be implemented in a form of a software functional unit.

What is claimed is:

1. A method comprising:
   polar-code encoding first control information;
   generating a first signal using a phase-shift keying (PSK) modulation type, wherein the first signal comprises a first sequence part, a first part, and a second part, wherein the first sequence part comprises a first predefined sequence, wherein the first part comprises the first control information, and wherein the second part comprises first advertisement information; and
   sending the first signal on a first advertisement dedicated frequency hopping channel.

2. The method of claim 1, further comprising polar code encoding the first advertisement information.

3. The method of claim 1, wherein the first advertisement information comprises at least one of first advertisement type information, a device identifier of a first device, a device type identifier of the first device, a type group identifier of a type group in which the first device is located, a device group identifier of a device group in which the first device is located, a first business service requested by the first device, a second business service provided by the first device, capability information of the first device, or service data information, and wherein the first advertisement type information comprises at least one of a first indication of whether the first device is scannable, a second indication of whether the first device is connectable, a third indication of whether directional information is comprised in the first signal and/or a second signal associated with the first signal, or a fourth indication of whether non-directional information is comprised in the first signal and/or the second signal.

4. The method of claim 1, further comprising:
   polar-code encoding second control information;
   generating a second signal using the PSK modulation, wherein the second signal sequentially comprises a second sequence part, a third part, and a fourth part, wherein the second sequence part carries a second predefined sequence, wherein the third part comprises the second control information, and wherein the fourth part comprises first extended advertisement information; and
   sending the second signal on a universal frequency hopping channel,
   wherein the first advertisement information indicates resource information used to send the second signal.

5. The method of claim 4, further comprising polar code encoding the first extended advertisement information.

6. The method of claim 4, wherein the first extended advertisement information further comprises at least one of second advertisement type information, a device identifier of a first device, a device type identifier of the first device, a type group identifier of a type group in which the first device is located, a device group identifier of a device group in which the first device is located, a first business service requested by the first device, a second business service provided by the first device, capability information of the first device, or service data information, and wherein the second advertisement type information comprises at least one of a first indication of whether the first device is scannable, a second indication of whether the first device is connectable, a third indication of whether directional information is comprised in the second signal and/or a third signal associated with the second signal, or a fourth indication of whether non-directional information is comprised in the second signal and/or the third signal.

7. The method of claim 1, wherein the first control information comprises a cyclic redundancy check and at least one of modulation scheme information of the second part, coding scheme information of the second part, length information of the second part, modulation and coding scheme information of the second part, or third advertisement type information, and wherein the third advertisement type information comprises at least one of a first indication of whether a first device is scannable, a second indication of whether the first device is connectable, a third indication of whether a directional information is comprised in the first signal and/or a second signal associated with the first signal, or a fourth indication of whether a non-directional information is comprised in the first signal and/or the second signal.

8. A method comprising:
   detecting, by a second device, a first signal on a first advertisement dedicated frequency hopping channel,
   wherein a first modulation type of the first signal is a phase-shift keying (PSK) modulation type,
   wherein the first signal sequentially comprises a first sequence part, a first part, and a second part,
   wherein the first sequence part comprises a first predefined sequence,
   wherein the first part comprises polar-code encoded first control information, and
   wherein the second part comprises first advertisement information.

9. The method of claim 8, wherein the first advertisement information is polar-code encoded.

10. The method of claim 8, wherein the first advertisement information comprises at least one of first advertisement type information, a device identifier of a first device, a device type identifier of the first device, a type group identifier of a type group in which the first device is located, a device group identifier of a device group in which the first device is located, a business service requested by the first device, a business service provided by the first device, capability information of the first device, or service data information, and wherein the first advertisement type information comprises at least one of a first indication of whether the first device is scannable, a second indication of whether the first device is connectable, a third indication of whether directional information is comprised in the first signal and/or a second signal associated with the first signal, or a fourth indication of whether non-directional information is comprised in the first signal and/or the second signal.

11. The method of claim 8, further comprising:
    receiving the first signal; and receiving a second signal on a universal frequency hopping channel, wherein a second modulation type of the second signal is the PSK modulation type, wherein the second signal sequentially comprises a second sequence part, a third part, and a fourth part, wherein the second sequence part carries a second predefined sequence, wherein the third part comprises polar-code encoded second control information, wherein the second part comprises first extended advertisement information, and wherein the first advertisement information indicates resource information used to send the second signal.

12. The method of claim 11, wherein the first extended advertisement information is polar-code encoded.

13. The method of claim 11, wherein the first extended advertisement information further comprises at least one second advertisement type information, a device identifier of a first device, a device type identifier of the first device, a type group identifier of a type group in which the first device is located, a device group identifier of a device group in which the first device is located, a first business service requested by the first device, a second business service provided by the first device, capability information of the first device, or service data information, and wherein the second advertisement type information comprises at least one of a first indication of whether the first device is scannable, a second indication of whether the first device is connectable, a third indication of whether directional information is comprised in the second signal and/or a third signal associated with the second signal, or a fourth indication of whether non-directional information is comprised in the second signal and/or the third signal.

14. The method of claim 13, wherein the polar-code encoded first control information comprises a cyclic redundancy check and at least one of modulation scheme information of the second part, coding scheme information of the second part, length information of the second part, modulation and coding scheme information of the second part, and third advertisement type information; and wherein the third advertisement type information comprises at least one of a fifth indication of whether the first device is scannable, a sixth indication of whether the first device is connectable, a seventh indication of whether the directional information is comprised in the first signal and/or a fourth signal associated with the first signal, or an eighth indication of whether the non-directional information is comprised in the first signal and/or the fourth signal.

15. A first device, comprising:
a memory configured to store instructions; and
one or more processors coupled to the memory and configured to execute the instructions to cause the first device to:
polar-code encode first control information;
generate a first signal using a phase-shift keying (PSK) modulation type, wherein the first signal comprises a first sequence part, a first part, and a second part, wherein the first sequence part comprises a first predefined sequence, wherein the first part comprises the first control information, and wherein the second part comprises first advertisement information; and
send the first signal on a first advertisement dedicated frequency hopping channel.

16. The first device of claim 15, wherein the one or more processors are further configured to execute the instructions to cause the first device to polar-code encode the first advertisement information.

17. The first device of claim 15, wherein the first advertisement information comprises at least one first advertisement type information, a device identifier of the first device, a device type identifier of the first device, a type group identifier of a type group in which the first device is located, a device group identifier of a device group in which the first device is located, a first business service requested by the first device, a second business service provided by the first device, capability information of the first device, or service data information, and wherein the first advertisement type information comprises at least one of a first indication of whether the first device is scannable, a second indication of whether the first device is connectable, a third indication of whether directional information is comprised in the first signal and/or a second signal associated with the first signal, or a fourth indication whether non-directional information is comprised in the first signal or the second signal.

18. The first device of claim 15, wherein the one or more processors are further configured to execute the instructions to cause the first device to:
polar-code encode second control information;
generate a second signal using the PSK modulation, wherein the second signal sequentially comprises a second sequence part, a third part, and a fourth part, wherein the second sequence part carries a second predefined sequence signal, wherein the third part comprises the second control information, and wherein the fourth part comprises first extended advertisement information; and
send the second signal on a universal frequency hopping channel, wherein the first advertisement information indicates resource information used to send the second signal.

19. The first device of claim 18, wherein the one or more processors are further configured to execute the instructions to cause the first device to polar-code encode the first extended advertisement information.

20. The first device of claim 18, wherein the first extended advertisement information further comprises at least one of second advertisement type information, a device identifier of the first device, a device type identifier of the first device, a type group identifier of a type group in which the first device is located, a device group identifier of a device group in which the first device is located, a first business service requested by the first device, a second business service provided by the first device, capability information of the first device, or service data information, and wherein the second advertisement type information comprises at least one of whether the first device is scannable, whether the first device is connectable, the second signal indicating whether directional information is comprised in the second signal and/or a third signal associated with the second signal, and the second signal indicating whether non-directional information is comprised in the second signal and/or the third signal.

* * * * *